United States Patent
Ohno et al.

(10) Patent No.: US 8,880,407 B2
(45) Date of Patent: Nov. 4, 2014

(54) PROJECTOR, PROJECTION SYSTEM, AND RETRIEVED INFORMATION DISPLAYING METHOD

(75) Inventors: Satoru Ohno, Tokyo (JP); Yoshiyuki Toda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 13/559,965

(22) Filed: Jul. 27, 2012

(65) Prior Publication Data

US 2013/0054248 A1 Feb. 28, 2013

(30) Foreign Application Priority Data

Aug. 23, 2011 (JP) ................................ 2011-181565

(51) Int. Cl.
*G10L 21/00* (2013.01)
*G10L 25/00* (2013.01)
*G03B 21/26* (2006.01)
*G06F 3/01* (2006.01)

(52) U.S. Cl.
CPC ...................................... *G06F 3/017* (2013.01)
USPC .............................. 704/275; 704/270; 353/28

(58) Field of Classification Search
USPC ...................... 704/231–257, 270–275; 353/28
See application file for complete search history.

(56) References Cited

U.S. PATENT DOCUMENTS

| | | | |
|---|---|---|---|
| 8,452,593 B2 * | 5/2013 | Huang et al. ................... | 704/231 |
| 2002/0082843 A1 * | 6/2002 | Schramm ....................... | 704/275 |
| 2008/0052484 A1 | 2/2008 | Ohno | |
| 2008/0062450 A1 | 3/2008 | Sugishita et al. | |
| 2008/0106769 A1 | 5/2008 | Ohno | |
| 2008/0117453 A1 | 5/2008 | Toda | |
| 2009/0031252 A1 | 1/2009 | Toda | |
| 2010/0169539 A1 | 7/2010 | Ohno | |
| 2010/0241653 A1 | 9/2010 | Sakiyama et al. | |
| 2011/0205147 A1 * | 8/2011 | Wilson et al. .................. | 345/156 |
| 2011/0209134 A1 | 8/2011 | Toda | |
| 2011/0221773 A1 * | 9/2011 | Kasuya et al. ................ | 345/634 |
| 2011/0279847 A1 | 11/2011 | Kakoi et al. | |
| 2011/0299115 A1 | 12/2011 | Toda et al. | |
| 2012/0154661 A1 * | 6/2012 | Shimada ..................... | 348/333.1 |
| 2012/0260177 A1 * | 10/2012 | Sehrer ........................... | 715/727 |

FOREIGN PATENT DOCUMENTS

| | | |
|---|---|---|
| JP | 2008-140377 | 6/2008 |
| JP | 2010-219928 | 9/2010 |

* cited by examiner

*Primary Examiner* — Jesse Pullias
(74) *Attorney, Agent, or Firm* — IPUSA, PLLC

(57) ABSTRACT

A projector includes a display part configured to display a first image by projection; a retrieval object specifying part configured to cause a user of the projector to specify an object of retrieval; a result display area specifying part configured to cause the user to specify an area for displaying the result of the retrieval in the displayed first image; and an image combining part configured to receive a second image of the result of the retrieval from a server that has performed the retrieval with respect to the object of retrieval specified by the user, and to display the second image by combining the second image with the area for displaying the result of the retrieval in the displayed first image.

11 Claims, 30 Drawing Sheets

FIG.12A

Cloud computing.
○○○○○○○○○○○○○○○○○
○○○○○○○○○○○○○○○○
○○○○○○○○○○○○○○○○○
○○○○○○○○○○○○○○

FIG.12B

Conventional use of computer is ○○○○○○○○○
○○○○○○○○○○○○○○○○○○○○○○○○○○
○○○○○○○○○○○○○○○○○○○. In cloud
computing, ○○○○○○○○○○○○○○○○○○
○○○○○○○○○○○○○○○○○○○
　○○○○○○○○○○○○○○○○○○○○○○
○○○○○○○○○○○○○○○○○○○○○○○○○
○○○○○○○○○○○○○○○○○○○○○○○○○
○○○○○○○○○○○○○○○○○○○○○○○○○
○○○○○○○○○○○○○○○○○○○○○○○○○
○○○○○○○○○○○○○○○○○○○○○○○○○
○○○○○○○○○○○○○○○○○○○○○○○○○
○○○○○○○○○○○○○○○○○○○○○○

PROJECTOR, PROJECTION SYSTEM, AND RETRIEVED INFORMATION DISPLAYING METHOD

CROSS-REFERENCE TO RELATED APPLICATION

The present application is based upon and claims the benefit of priority to Japanese Patent Application No. 2011-181565, filed on Aug. 23, 2011, the entire contents of which are incorporated herein by reference.

BACKGROUND OF THE INVENTION

1. Field of the Invention

The present invention relates to a projector, a projection system, and a retrieved information displaying method.

2. Description of the Related Art

In conferences, a presenter gives a presentation while displaying the image of presentation material on a screen. In these years, a projector is connected to a computer to display the image of the presentation material output by the computer.

Further, a technique has been known that allows the presenter to highlight characters that the presenter desires to emphasize in the images of the presentation material by underlining or hatching the characters using a laser pointer or the like during the presentation. In general, the portion of the image of the presentation material highlighted by the presenter often has an important meaning. In some cases, however, not all of the audience of the presentation understand the meaning of the highlighted portion.

In order to solve this problem, an information providing apparatus has been known that includes a display part to output presentation data for display, a specific instruction receiving part to receive an instruction to specify a portion of the output presentation data, a related information retrieving part to retrieve information related to the portion of the presentation data specified by the instruction, a conversion part to convert the presentation data into transmission data from which the information related to the specified portion is extractable, and a transmission part to transmit the transmission data. (See, for example, Japanese Laid-Open Patent Application No. 2010-219928.)

SUMMARY OF THE INVENTION

According to an aspect of the present invention, a projector includes a display part configured to display a first image by projection; a retrieval object specifying part configured to cause a user of the projector to specify an object of retrieval; a result display area specifying part configured to cause the user to specify an area for displaying a result of the retrieval in the displayed first image; and an image combining part configured to receive a second image of the result of the retrieval from a server that has performed the retrieval with respect to the object of retrieval specified by the user, and to display the second image by combining the second image with the area for displaying the result of the retrieval in the displayed first image.

According to an aspect of the present invention, a projection system includes a projector; and a server connected to the projector, wherein the projector includes a display part configured to display a first image by projection; a retrieval object specifying part configured to cause a user of the projector to specify an object of retrieval; a result display area specifying part configured to cause the user to specify an area for displaying a result of the retrieval in the displayed first image; and an image combining part configured to receive a second image of the result of the retrieval from the server that has performed the retrieval with respect to the object of retrieval specified by the user, and to display the second image by combining the second image with the area for displaying the result of the retrieval in the displayed first image, and wherein the server includes a notification part configured to be notified, by the projector, of the object of retrieval and the area for displaying the result of the retrieval specified by the user; a retrieval part configured to perform the retrieval with respect to the object of retrieval specified by the user; a generation part configured to generate the second image by adjusting the result of the retrieval so that the result of the retrieval fits in a size of the area for displaying the result of the retrieval; and a transmission part configured to transmit the generated second image to the projector.

According to an aspect of the present invention, a retrieved information displaying method executed by a projector includes displaying a first image by projection; causing a user of the projector to specify an object of retrieval; causing the user to specify an area for displaying a result of the retrieval in the displayed first image; and receiving a second image of the result of the retrieval from a server that has performed the retrieval with respect to the object of retrieval specified by the user, and displaying the second image by combining the second image with the area for displaying the result of the retrieval in the displayed first image.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIGS. 12A, 12B, and 12C are conceptual diagrams illustrating retrieval result images composed of respective appropriate amounts of information for corresponding sizes of a result display area according to the first embodiment;

DETAILED DESCRIPTION OF THE PREFERRED EMBODIMENTS

However, with respect to the above-described conventional information providing apparatus, although there is a description of receiving an instruction to specify a portion of the output presentation data and retrieving information related to the portion specified by the instruction, it is not clear how the retrieved related information is displayed.

For example, it is an obstacle to a creator of the presentation data to preset the display position of the related information. Further, if the display position of the related information is fixed, a part necessary for the presentation may be covered with the related information. Furthermore, in the case of determining the display position of the related information by automatically detecting a margin from the presentation data, the related information may not be sufficiently displayed if the margin is not sufficient. Thus, a problem arises whether the display position of the related information is preset, fixed, or determined by automatically detecting a margin.

According to an aspect of the present invention, a projector, a projection system, and a retrieved information displaying method are provided that allow the result of retrieval related to a specified portion of a displayed image to be displayed at a position according to a situation.

A method, apparatus, system, computer program, recording medium and data structure to which elements, representations, or any combinations thereof according to an aspect of the present invention are applied are effective as embodiments according to the present invention.

A description is given below of embodiments of the present invention.

[a] First Embodiment

Figure 1:
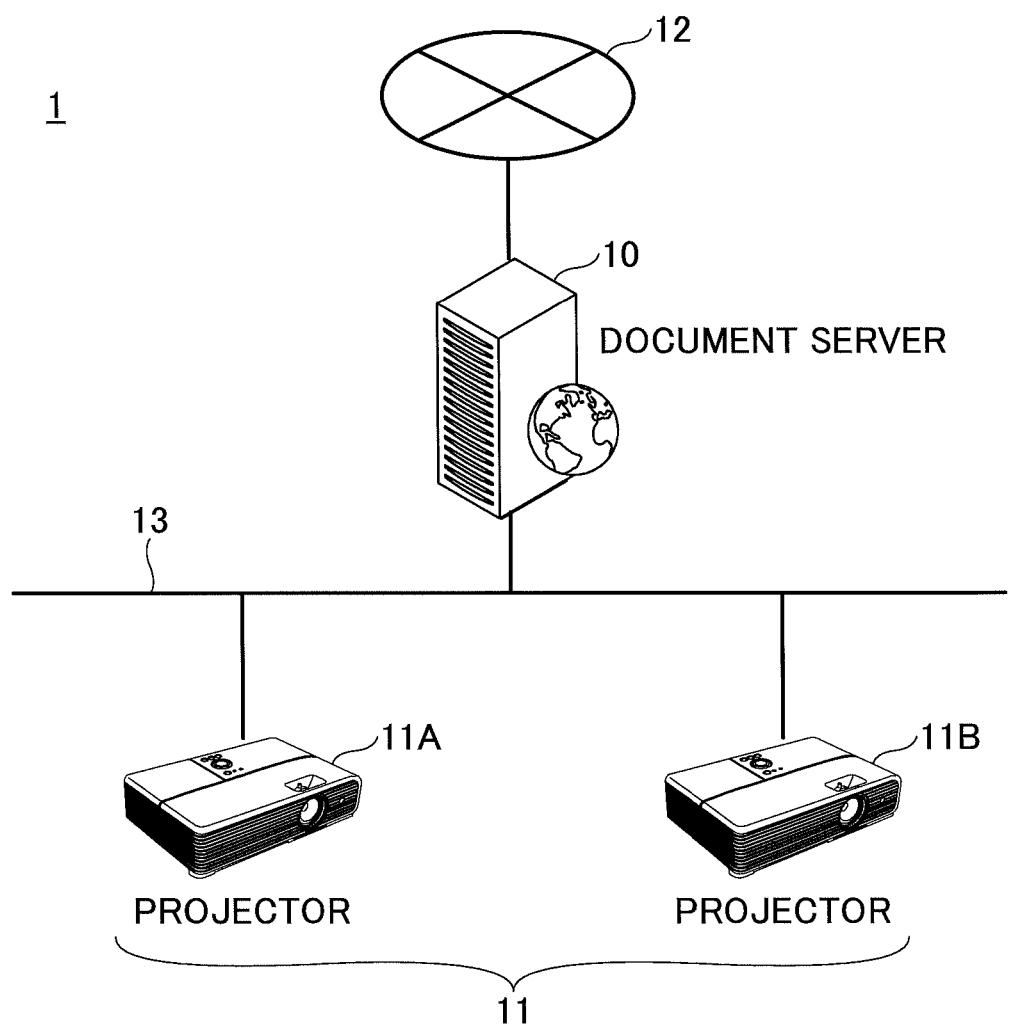
FIG. 1 is a diagram illustrating a configuration of a projection system according to a first embodiment.

FIG. 1 is a diagram illustrating a configuration of a projection system according to a first embodiment.

Referring to FIG. 1, a projection system 1 includes a document server 10, projectors 11A and 11B, and networks 12 and 13. The projectors 11A and 11B may be collectively referred to as "projector 11" if no distinction is made between the projector 11A and the projector 11B. The projection system 1 of FIG. 1 illustrates the case of a single document server (the document server 10) and two projectors (the projectors 11A and 11B).

The document server 10 is connected to the network 12 such as the Internet. Further, the document server 10 is connected to the network 13 such as a local area network (LAN) or a wide area network (WAN). The network 13 may be either a wire or a wireless network. The document server 10 is connected to the projector 11 via the network 13. The document server 10 contains the files of images of presentation material used in conferences or the like. The projector 11 obtains (receives) the file of the image of presentation material from the document server 10 and projects the read file onto a screen (not graphically illustrated in FIG. 1).

The file obtained from the document server 10 by the projector 11 is not limited to the file of the image of presentation material, and may be the file of any image projectable onto the screen by the projector 11. Further, according to the projection system 1 of FIG. 1, the document server 10 and the projector 11 are provided separately. Alternatively, however, the document server 10 and the projector 11 may be formed as a unit.

Figure 2:
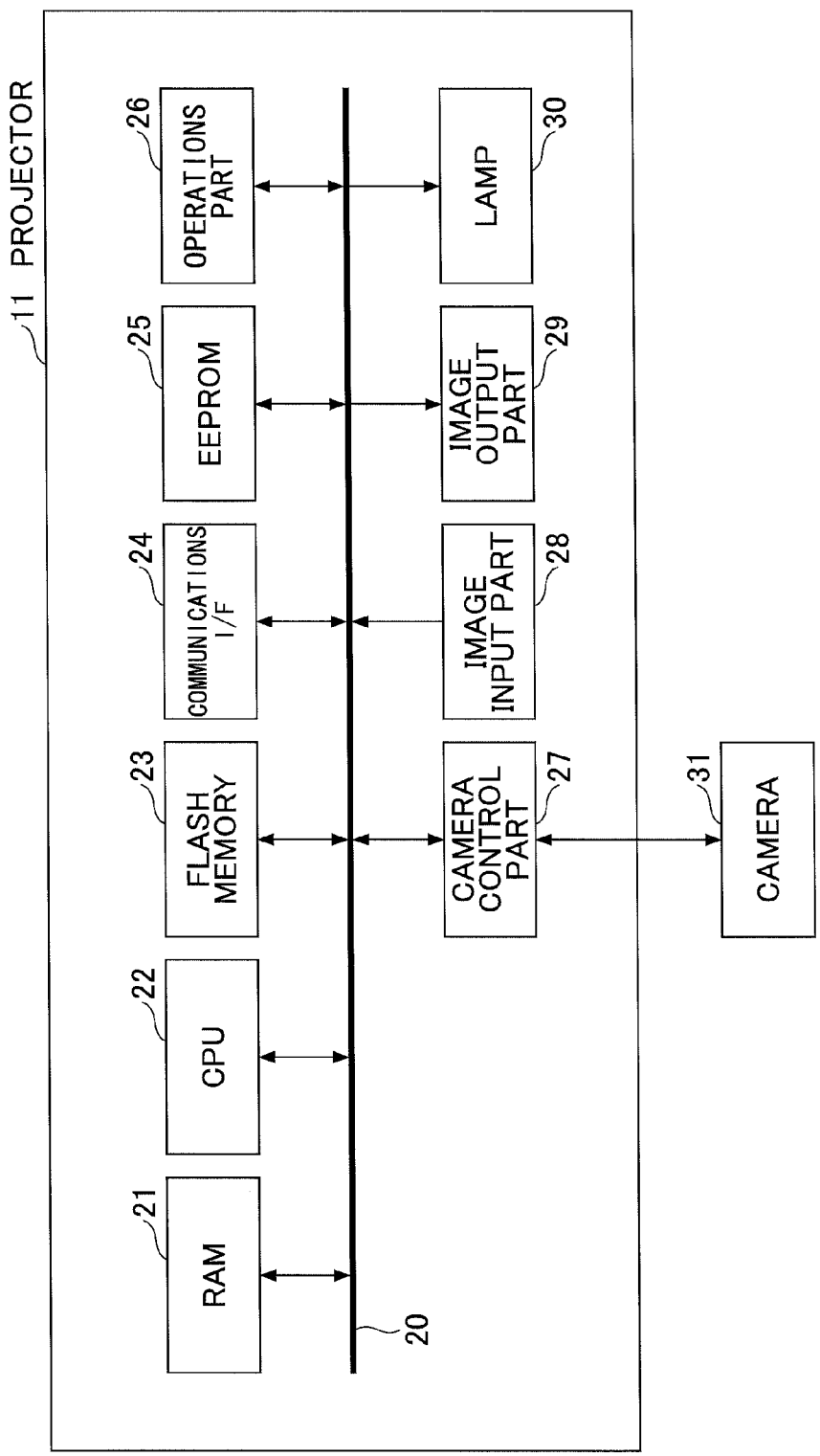
FIG. 2 is a block diagram illustrating a hardware configuration of a projector according to the first embodiment.

FIG. 2 is a block diagram illustrating a hardware configuration of the projector 11 according to this embodiment. The projector 11 includes a random access memory (RAM) 21, a central processing unit (CPU) 22, a flash memory 23, a communications interface (I/F) 24, an electrically erasable programmable read-only memory (EEPROM) 25, an operations part 26, a camera control part 27, an image input part 28, an image output part 29, and a lamp 30, which are interconnected by a bus 20.

The RAM 21, the CPU 22, the flash memory 23, the EEPROM 25, the operations part 26, the image input part 28, the image output part 29, and the lamp 30 are an example of part of the projector that implements a basic projection function. The communications I/F 24 is used to work together with the document server 10. The camera control part 27 is connected to a camera 31.

The camera control part 27 controls the camera 31. The camera 31 captures images (including video) of the image of presentation material projected on the screen, a presenter, etc., under the control of the camera control part 27. The images captured by the camera 31 are stored in, for example, the RAM 21 via the camera control part 27. As described below, the images captured by the camera 31 are used to recognize the gesture of a presenter. The camera 31 may be contained in the projector 11.

The operations part 26 receives operations by a presenter. The communications I/F 24 is, for example, a LAN card. The communications I/F 24 is used to connect to the network 13. The image input part 28 receives the input of images. The image output part 29 outputs images. In the case of liquid-crystal projectors, the image output part 29 is a liquid crystal display unit. The lamp 30 emits light. The light emitted from the lamp 30 passes through the image output part 29 to be projected onto the screen through a lens (not graphically illustrated). The image displayed on the image output part 29 is magnified and displayed on the screen.

The flash memory 23 and the EEPROM 25 store files and data. When the projector 11 is turned on, programs are read from the flash memory 23 and the EEPROM 25 to be stored in the RAM 21. The CPU 21 implements various kinds of functions in accordance with programs stored in the RAM 21.

Figure 3:
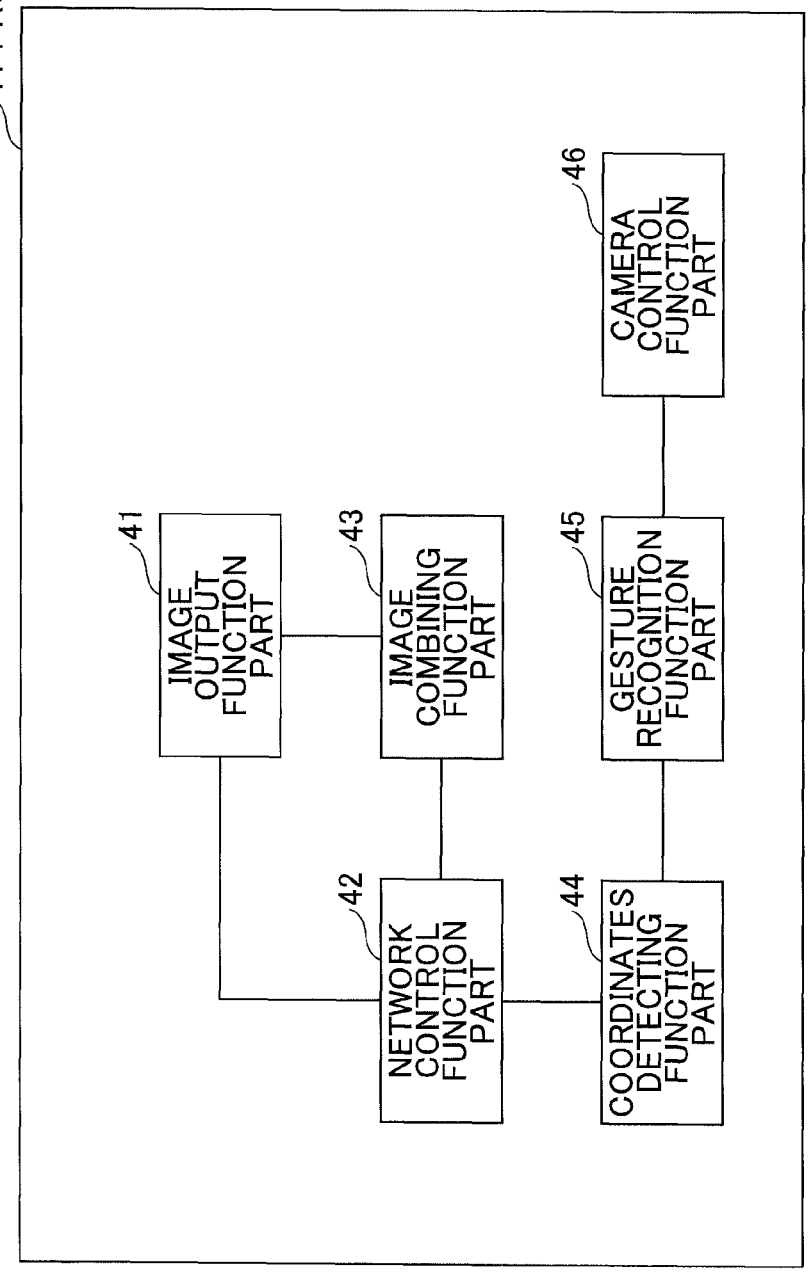
FIG. 3 is a block diagram illustrating a functional configuration of the projector according to the first embodiment.

FIG. 3 is a block diagram illustrating a functional configuration of the projector 11 according to this embodiment. The projector 11 includes an image output function part 41, a network control function part 42, an image combining function part 43, a coordinates detecting function part 44, a gesture recognition function part 45, and a camera control function part 46. The projector 11 illustrated in FIG. 3 may further includes function parts such as a lamp control function part, an electric power control function part, an operations panel control function part, and a data storage control function part, whose graphical representation is omitted.

The image output function part 41 controls the image output part 29 to cause the image output part 29 to output images. The network control function part 42 controls the communications I/F 24 to work together with the document server 10. The image combining function part 43 combines a below-described retrieval result image transmitted from the document server 10 with the image of presentation material.

The coordinates detecting function part 44 detects the position (coordinates) on the image of presentation material specified by a presenter with a below-described gesture of the presenter when the image of presentation material is projected on the screen. The gesture recognition function part 45 recognizes the gesture of the presenter from the image captured with the camera 31. The camera control function part 46 controls the camera 31 to capture images of the image of presentation material projected on the screen, the presenter, etc.

As described in Japanese Laid-Open Patent Application No. 2010-219928, the technique of analyzing captured video and detecting a position indicated by a presenter with a laser pointer or the like on the screen is known. For example, the gesture recognition function part 45 is allowed to recognize the gesture of a presenter based on the locus of positions (for example, a circle) indicated by the presenter with a laser pointer or the like on the screen from the video captured with the camera 31.

Further, for example, the gesture recognition function part 45 is allowed to recognize the gesture of a presenter based on a motion of the body of the presenter (for example, turning a hand) from the video captured with the camera 31. By recognizing the gesture of the presenter, the projector 11 receives an instruction from the presenter correlated with the gesture.

Figure 4:
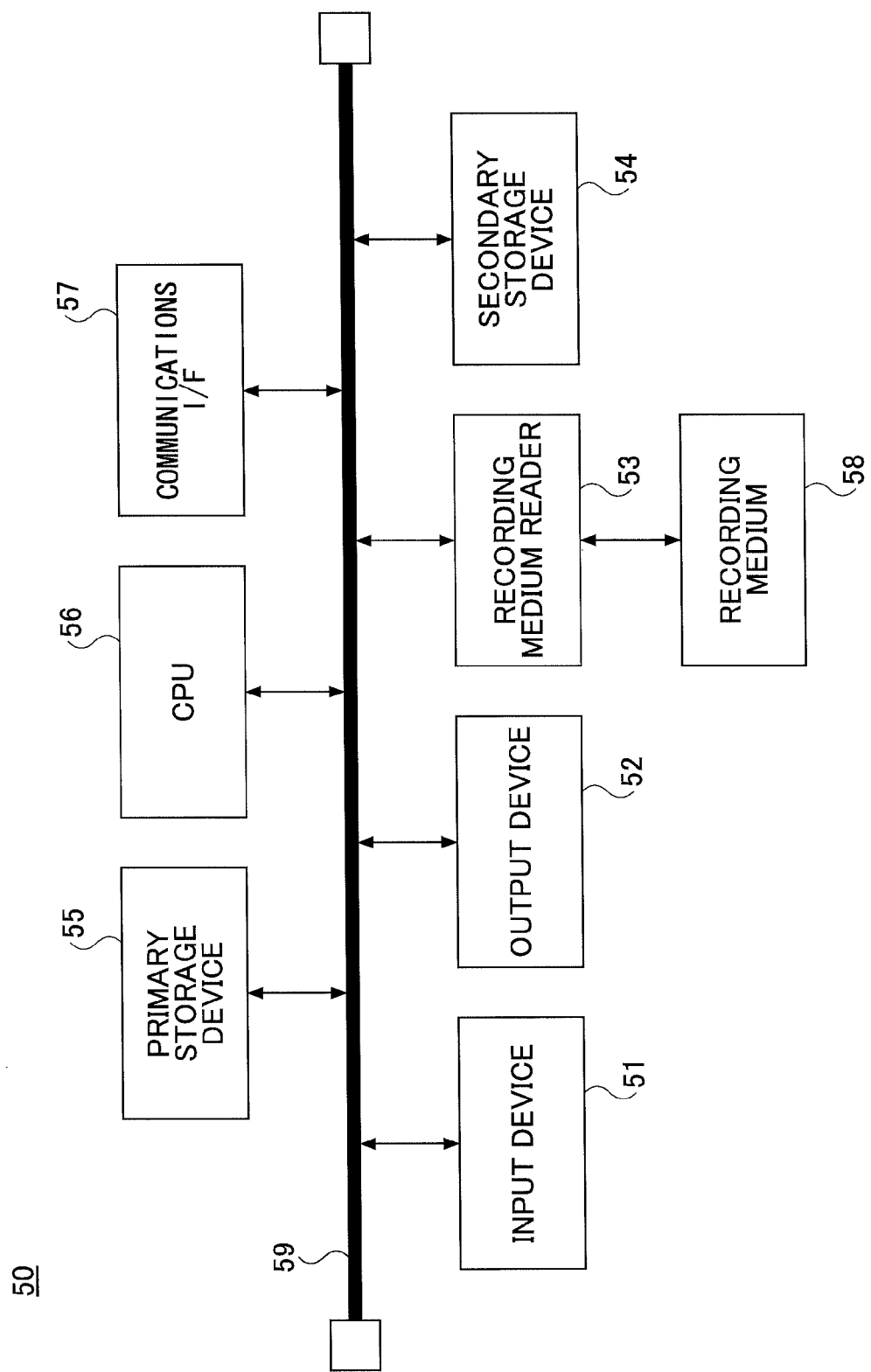
FIG. 4 is a block diagram illustrating a hardware configuration of a personal computer according to the first embodiment.

FIG. 4 is a block diagram illustrating a hardware configuration of a personal computer (PC) according to this embodiment. For example, the document server 10 is implemented by a PC 50 having a hardware configuration as illustrated in FIG. 4.

The PC 50 includes an input device 51, an output device 52, a recording medium reader 53, a secondary storage device 54, a primary storage device 55, a CPU 56, and a communications I/F 57, which are interconnected by a bus 59.

The input device 51 includes a keyboard and a mouse. The input device 51 is used to input various kinds of signals to the PC 50. The output device 52 includes a display unit. The output device 52 is used to display various kinds of windows and data. The communications I/F 57 includes a modem and a LAN card. The communications I/F 57 is used to connect to the networks 12 and 13.

A program that implements the document server 10 may be provided, for example, through distribution of a recording medium 58 containing the program or through downloading from the network 12 or 13.

Various kinds of recording media may be used as the recording medium 58. Examples of the recording medium 58 include recording media on which information is optically, electrically, or magnetically recorded, such as a CR-ROM, a flexible disk, and a magneto-optical disk, and semiconductor memories on which information is electrically recorded, such as a flash memory.

When the recording medium 58 on which a program is recorded is loaded into the recording medium reader 53, the program is installed in the secondary storage device 54 from the recording medium 58 via the recording medium reader 53. A program downloaded through the network 12 or 13 is installed in the secondary storage device 54 via the communications I/F 57.

The secondary storage device 54 stores programs, files, and data. The primary storage device 55 reads a program from the secondary storage device 54 and stores the read program at the time of activating the program. The CPU 56 implements various kinds of functions in accordance with the program stored in the primary storage device 55.

Figure 5:
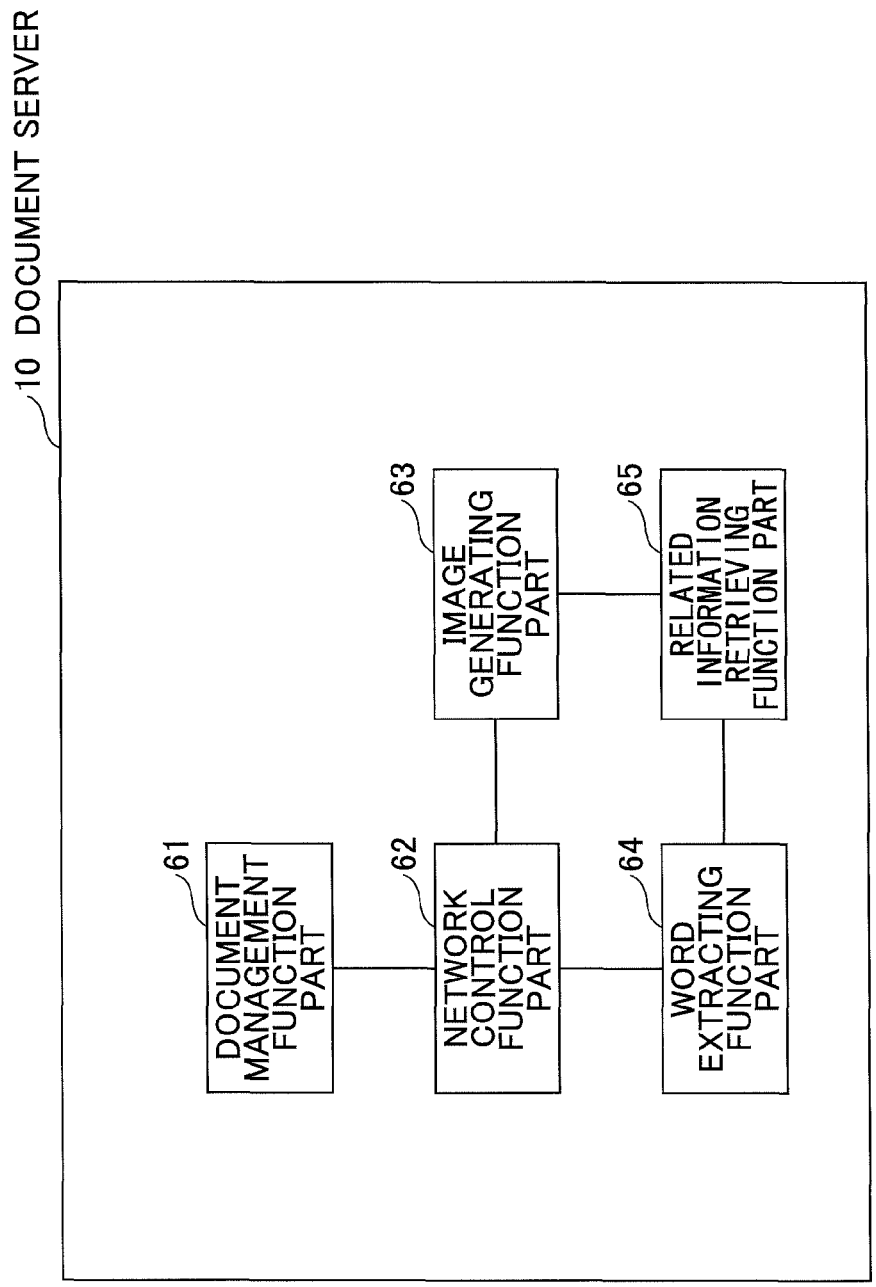
FIG. 5 is a block diagram illustrating a functional configuration of a document server according to the first embodiment.

FIG. 5 is a block diagram illustrating a functional configuration of the document server 10 according to this embodiment. The document server 10 includes a document management function part 61, a network control function part 62, an image generating function part 63, a word extracting function part 64, and a related information retrieving function part 65. The document management function part 61 manages the files of images of presentation material used in conferences or the like.

The network control function part 62 controls the communications I/F 57 to work together with the projector 11. The network control function part 62 receives specified position information and result display area information from the projector 11. The specified position information represents a position (coordinates) specified by a presenter. The result display area information represents the size of an area for displaying a result (a result display area) specified by the presenter.

The word extracting function part 64 extracts a word, a phrase, etc., to serve as a keyword based on the file of the image of presentation material managed by the document management function part 61 and on the specified position information received from the projector 11 as described above. The related information retrieving function part 65 retrieves related information from the World Wide Web, a specified database or the like based on, for example, a word serving as a keyword. The image generating function part 63 generates a retrieval result image (the image of a retrieval result) by adjusting the retrieved related information (retrieval result) so that the retrieved related information fits in the size of the result display area sent from the projector 11. The retrieval result image is transmitted to the projector 11.

Figure 6:
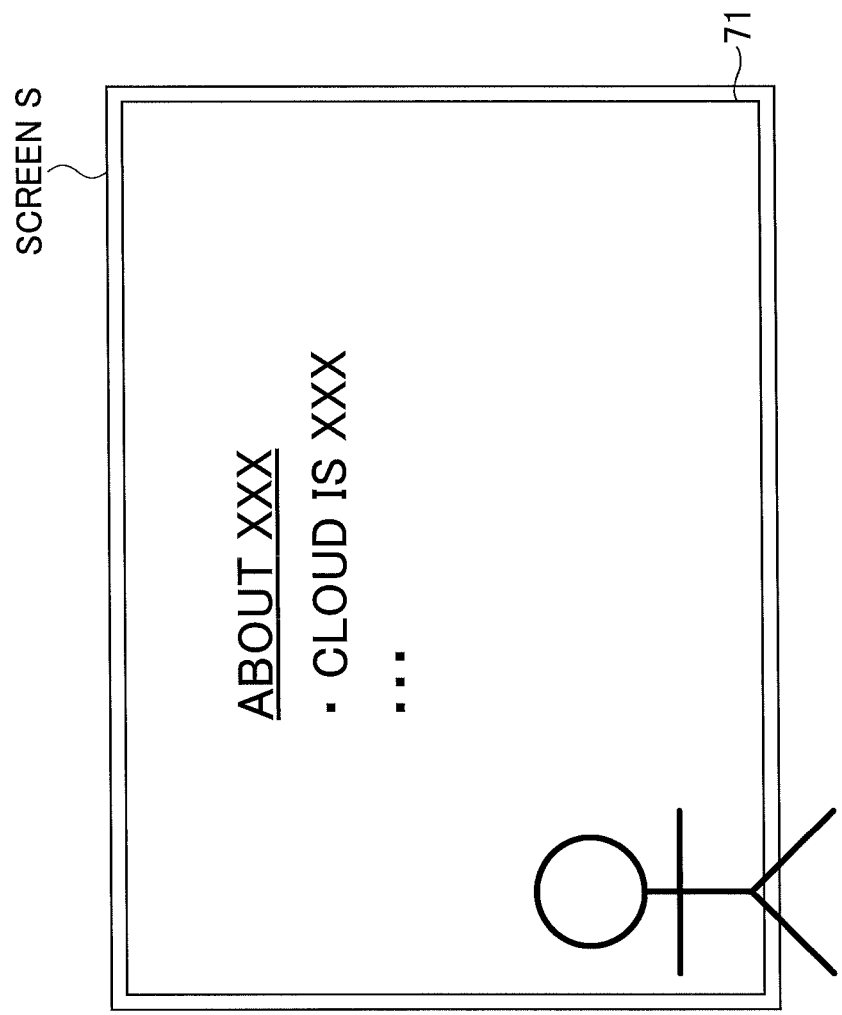
FIG. 6 is a conceptual diagram illustrating an image projected on a screen according to the first embodiment.

FIG. 6, FIG. 7, FIG. 8, and FIG. 9 are conceptual diagrams illustrating images projected on the screen. In FIG. 6, an image 71 of presentation material obtained from the document server 10 by the projector 11 is projected on a screen S.

Figure 7:
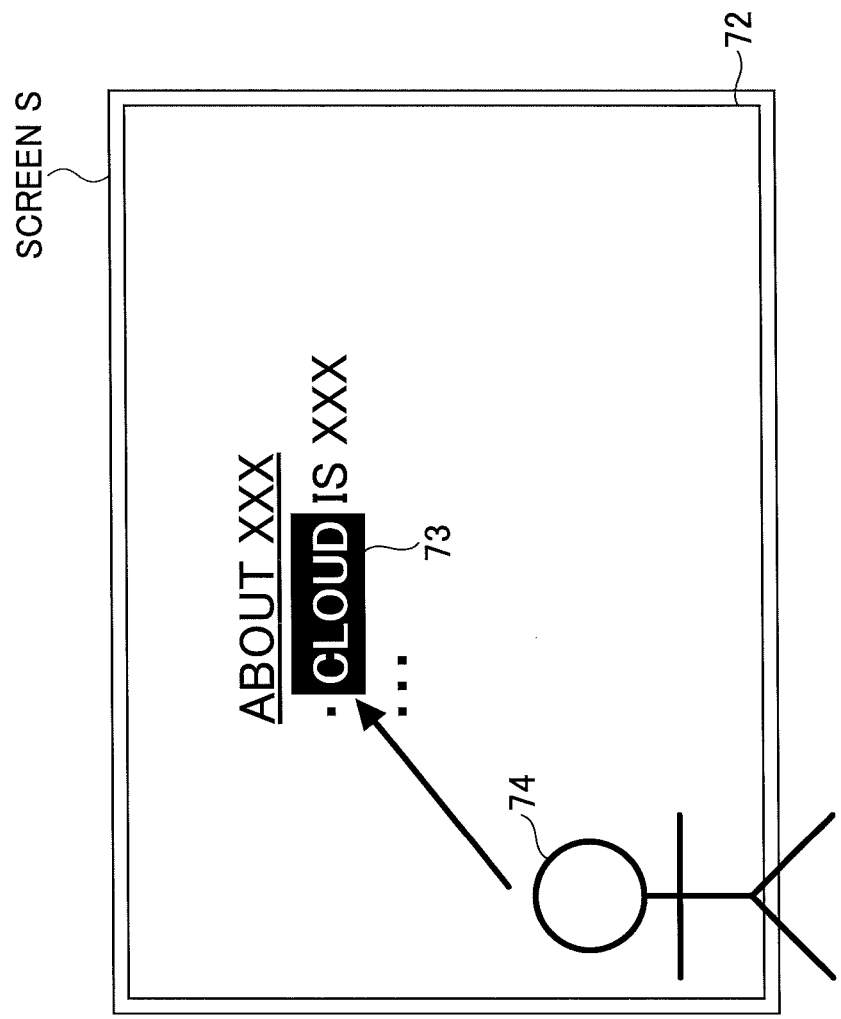
FIG. 7 is a conceptual diagram illustrating an image projected on the screen according to the first embodiment.

In FIG. 7, a display position 73 of a word "CLOUD" as part of an image 72 of the presentation material projected on the screen S is detected through a gesture made by a presenter 74, and the word "CLOUD" is highlighted as a selected object of retrieval (with respect to which a retrieval operation is to be performed to retrieve related information).

Figure 8:
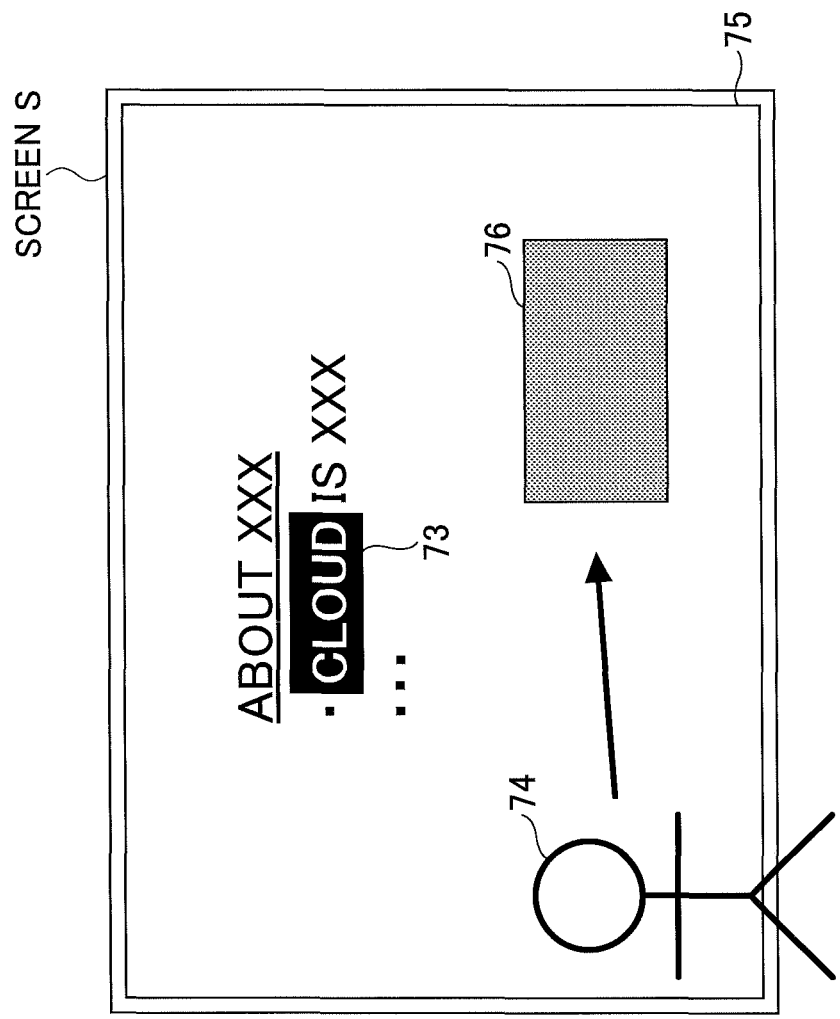
FIG. 8 is a conceptual diagram illustrating an image projected on the screen according to the first embodiment.

In FIG. 8, the position and size of a result display area 76 in which a retrieval result image is desired to be displayed are specified through a gesture made by the presenter 74 and displayed in an image 75 of the presentation material. The result display area 76 represents, for example, a position where a retrieval result screen (window) is desired to "pop up" (to be displayed in a pop-up manner) and the size of the retrieval result screen.

After the image 75 of FIG. 8 is displayed, the document server 10 extracts, for example, a word to serve as a keyword based on the file of the image of the presentation material and the specified position information received from the projector 11 as described below. Further, the document server 10 retrieves related information from the World Wide Web, a specified database or the like based on the word serving as a keyword. The document server 10 generates a retrieval result image 78 (FIG. 9) of an appropriate amount of information based on the result display area information received from the projector 11.

Here, the appropriate amount of information refers to, for example, a brief explanation of the word if the result display area 76 is small or limited in size, and a detailed explanation of the word and a picture, video, etc., related to the word if the result display area 76 is large in size. The document server 10 may generate the retrieval result image 78 in format more easily understandable to the audience of the presentation in accordance with the font settings (font color, font size, typeface such as Arial, Gothic, etc.) and the background color of the image of the presentation material at the time of generating the retrieval result image 78. The generated retrieval result image 78 is transferred to the projector 11.

Figure 9:
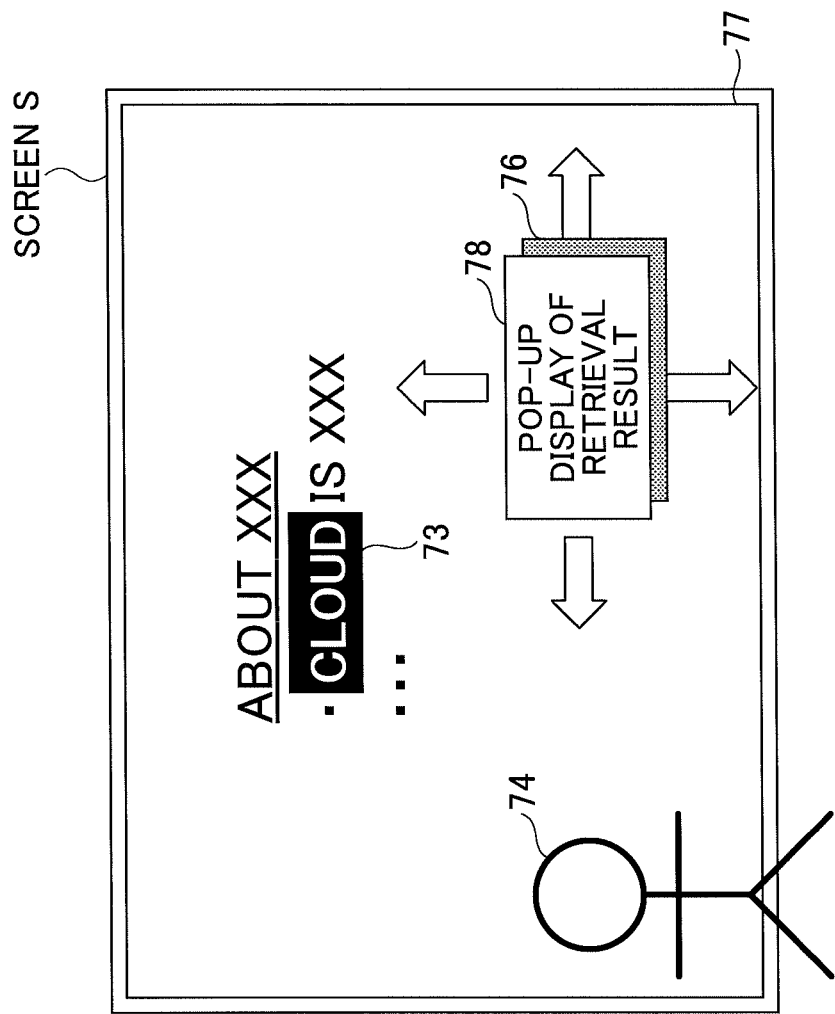
FIG. 9 is a conceptual diagram illustrating an image projected on the screen according to the first embodiment.

The projector 11 receives the generated retrieval result image 78 transferred from the document server 10. The projector 11 combines the received retrieval result image 78 with the result display area 76 specified by the presenter 74 in an image 77 of the presentation material, and projects the retrieval result image 78 onto the screen S as illustrated in FIG. 9. The projector 11 may move the display position of the retrieval result image 78 in response to a gesture made by the presenter 74.

Figure 10:
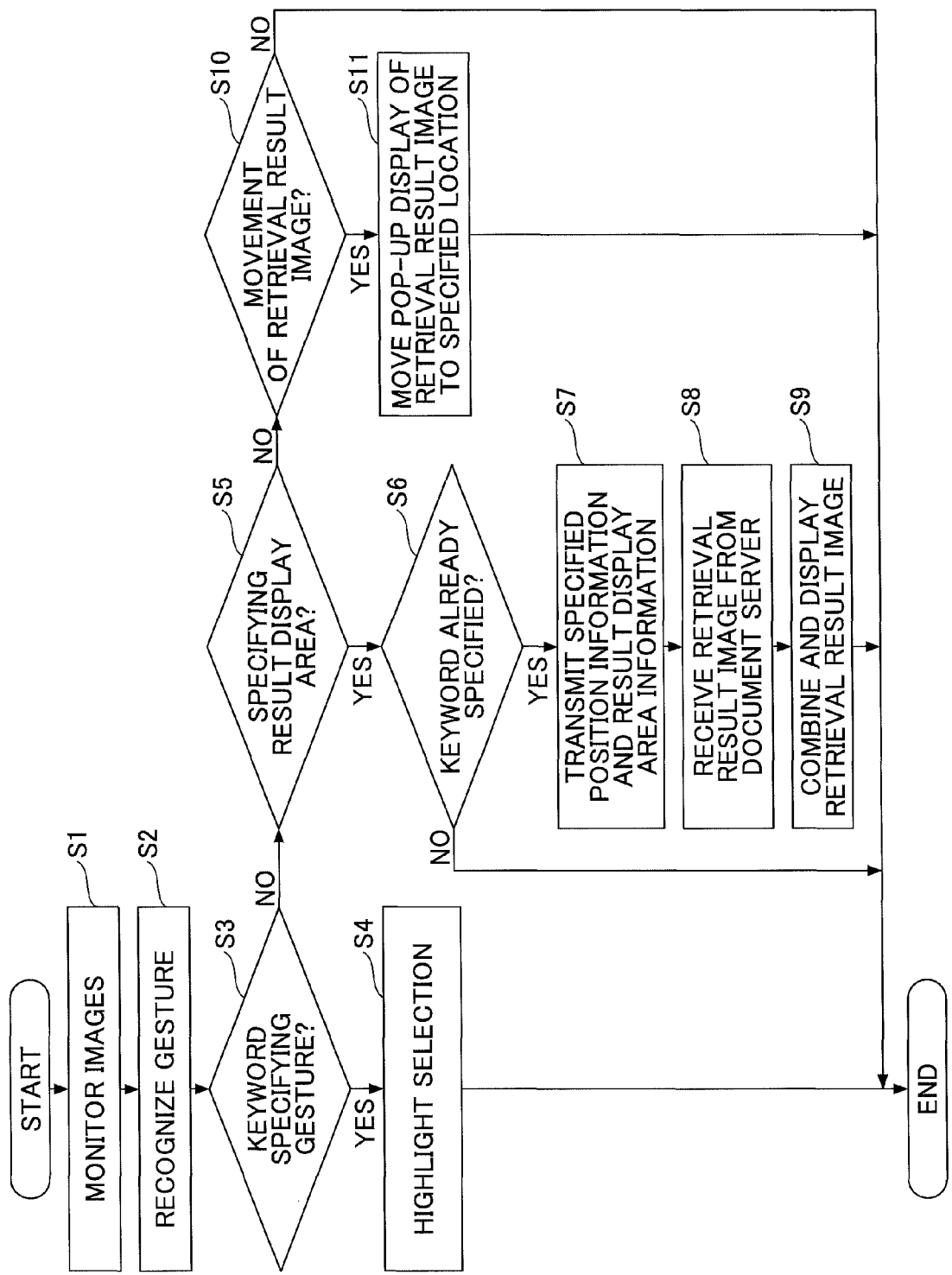
FIG. 10 is a flowchart illustrating a flow of a process performed by the projector according to the first embodiment.

FIG. 10 is a flowchart illustrating a flow of a process performed by the projector 11.

In step S1, the gesture recognition function part 45 monitors images (or video) captured with the camera 31. In step S2, the gesture recognition function part 45 recognizes (identifies) a particular gesture of a presenter in the images captured with the camera 31.

In step S3, the gesture recognition function part 45 determines whether the recognized gesture is a gesture that specifies a keyword. If the gesture recognition function part 45 recognizes the gesture as specifying a keyword (YES in step S3), the coordinates detecting function part 44 detects a selection or a position in the image of presentation material specified by the presenter with the gesture. In step S4, the image combining function part 43 combines highlighting with the image of the presentation material to highlight the selection (selected or specified portion of the image).

If the gesture recognition function part 45 determines in step S3 that the recognized gesture is not a gesture that specifies a keyword (NO in step S3), in step S5, the gesture recognition function part 45 determines whether the recognized gesture is a gesture that specifies a result display area. In response to recognizing the gesture as specifying a result display area (YES in step S5), in step S6, the gesture recognition function part 45 determines whether a keyword has been specified. If a keyword has been specified (YES in step S6), in step S7, the network control function part 42 transmits the position (selection) specified in the image of the presentation material by the presenter and the size of the result display area specified by the presenter to the document server 10 as specified position information and as result display area information, respectively.

In step S8, the network control function part 42 receives a retrieval result image from the document server 10. In step S9, the image combining function part 43 combines the retrieval result image transmitted from the document server 10 with the result display area in the image of the presentation material. The image output function part 41 displays the image of the presentation material combined with the retrieval result image.

If a keyword has not been specified in step S6 (NO in step S6), the network control function part 42 does not execute the process of steps S7 through S9. Further, if no word to serve as a keyword is detected from the position (selection) in the image of the presentation material indicated by the specified position information, the document server 10 does not retrieve (search for) related information because an object of retrieval is unidentified.

Further, if the gesture recognition function part 45 determines in step S5 that the recognized gesture is not a gesture that specifies a result display area (NO in step S5), in step S10, the gesture recognition function part 45 determines whether the recognized gesture is a gesture that intends a movement of the display position of a retrieval result image. If the gesture recognition function part 45 recognizes the gesture as intending the movement of the display position of a retrieval result image (YES in step S10), in step S11, the image combining function part 43 moves the display position of the retrieval result image to a location specified by the presenter by re-combining the retrieval result image transmitted from the document server 10 with the image of the presentation material. If the gesture recognition function part 45 does not recognize the gesture as intending the movement of the display position of a retrieval result image in step S10 (NO in step S10), the image combining function part 43 does not execute the process of step S11.

As illustrated in the flowchart of FIG. 10, the projector 11 may recognize (identify) gestures of a presenter from images or video captured with the camera 31, and receive instructions from the presenter correlated with the gestures, such as the specifying of a keyword, the specifying of a result display area, and the movement of the display position of a retrieval result image.

Figure 11:
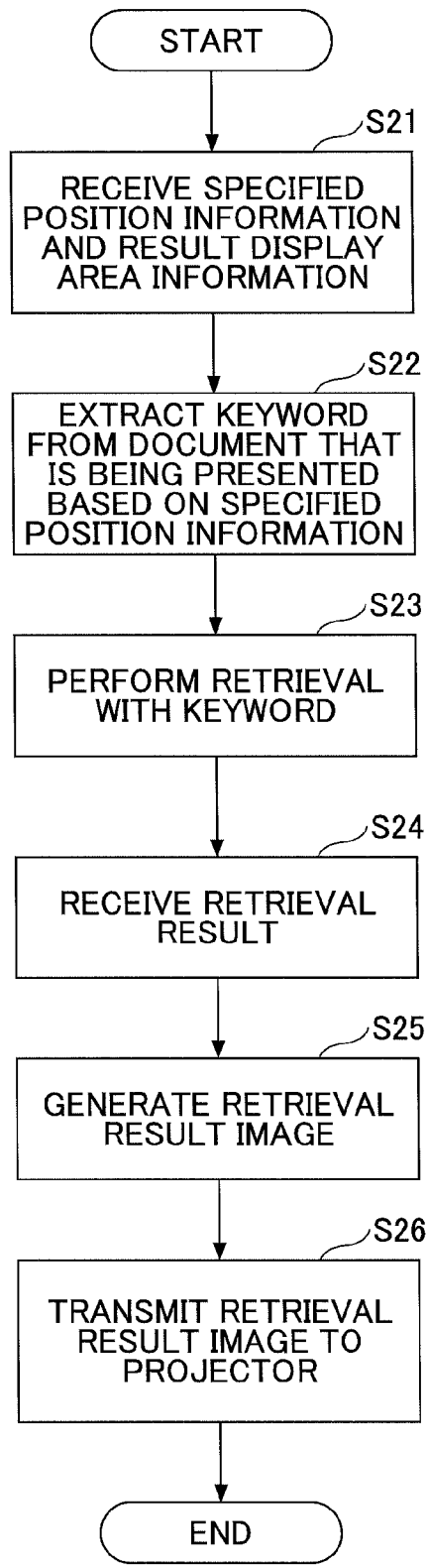
FIG. 11 is a flowchart illustrating a flow of a process performed by the document server according to the first embodiment.

FIG. 11 is a flowchart illustrating a flow of a process performed by the document server 10.

In step S21, the network control function part 62 receives specified position information and result display area information from the projector 11. In step S22, the word extracting function part 64 extracts a word to serve as a keyword based on the file of the image of presentation material (a document that is being presented) managed by the document management function part 61 and on the specified position information received from the projector 11.

In step S23, the related information retrieving function part 65 retrieves related information (information related to the extracted word) based on the word serving as a keyword. For example, the World Wide Web, a specified database and/or the like is searched for the related information. The search (retrieval) method and the method of determining an object of search are not limited in particular, and a description of specific methods is omitted.

In step S24, the related information retrieving function part 65 receives the retrieved related information (retrieval result). In step S25, the image generating function part 63 generates a retrieval result image by processing the retrieval result to an appropriate amount of information so that the retrieval result fits in the size of the result display area sent from the projector 11. A description is given below of the details of the process of step S25. In step S26, the network control function part 62 transmits the generated retrieval result image to the projector 11.

As illustrated in the flowchart of FIG. 11, the document server 10 extracts a word selected on the screen by a presenter based on the file of the image of presentation material (a document that is being presented) managed by the document management function part 61 and on the presenter-specified position received from the projector 11. As a result, the document server 10 generates a retrieval result image from the related information retrieved using the word selected on the screen by the presenter as a keyword, and transmits the generated retrieval result image to the projector 11.

Figure 12C:
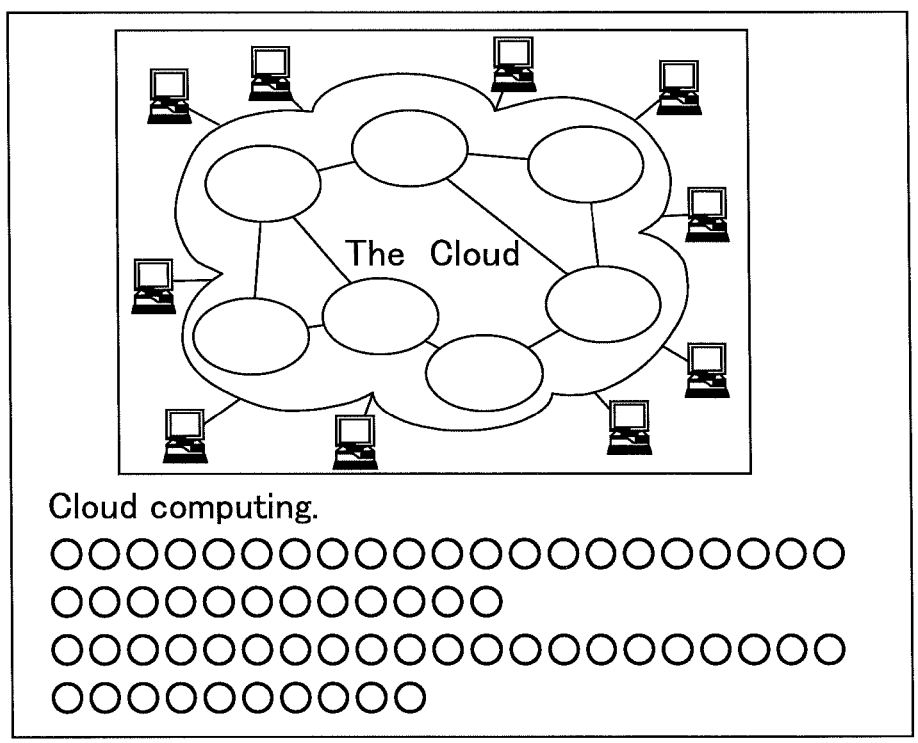

FIGS. 12A, 12B, and 12C are conceptual diagrams illustrating retrieval result images composed of respective appropriate amounts of information for corresponding sizes of the result display area. FIG. 12A illustrates a retrieval result image when the result display area is small or limited. As illustrated in FIG. 12A, the retrieval result image in the case of a small-size result display area displays, for example, a brief or general description of a keyword in text (an explanatory note).

FIG. 12B and FIG. 12C illustrate retrieval result images when the result display area is large. The retrieval result image in the case of a large-size result display area displays, for example, the details of a keyword in text (an explanatory note) as illustrated in FIG. 12B, and may also display a photograph or video related to the keyword as illustrated in FIG. 12C.

In the case of displaying text (such as characters) in the retrieval result image, categories such as a brief description and a detailed description may be preset in information in a specified database. Even if no categories such as a brief description and a detailed description are preset, the information in a specified database may be divided according to the segmentation of clauses or phrases or the number of characters in the case of displaying text (such as characters) in the retrieval result image.

Figure 13A:
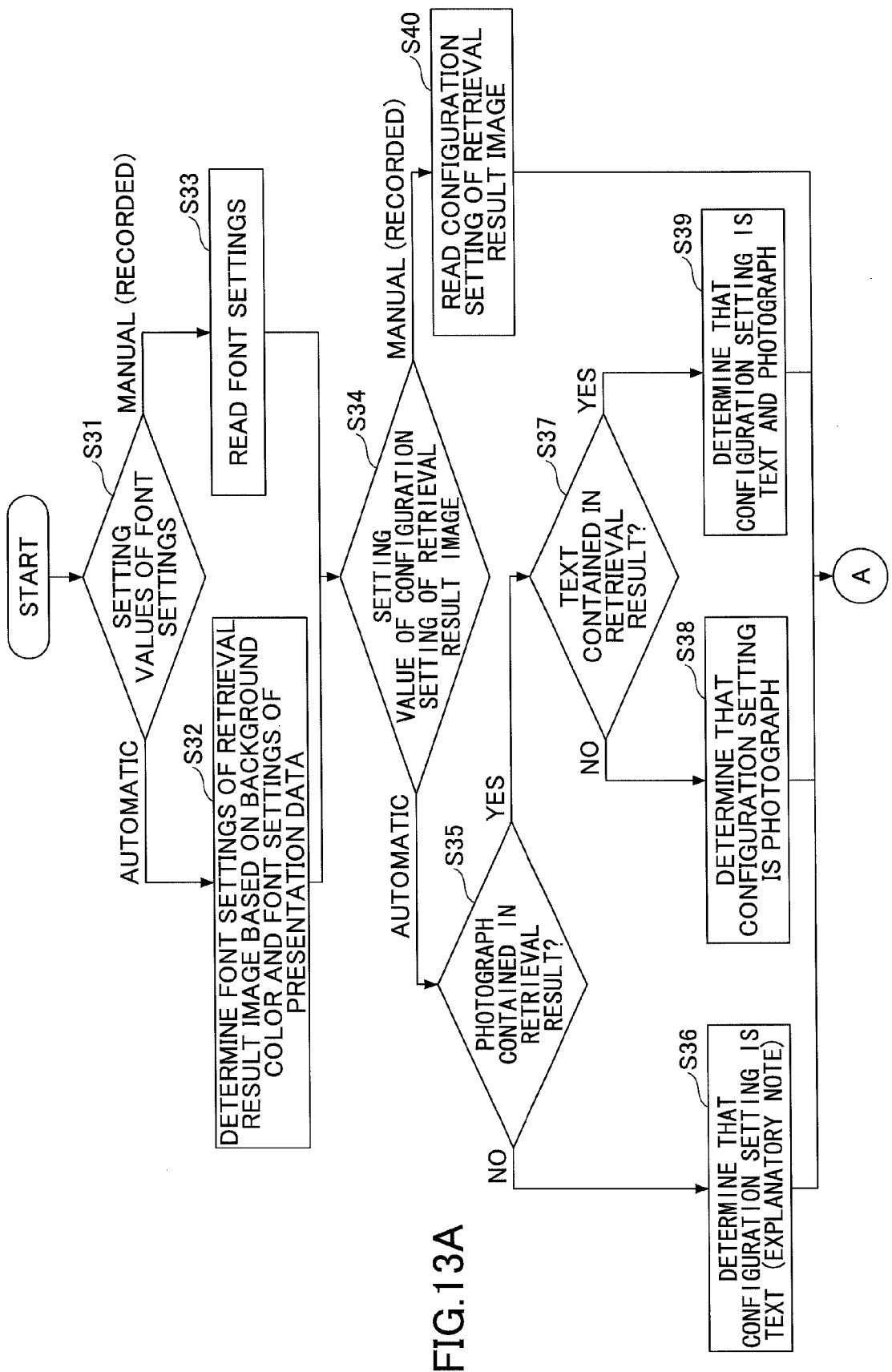
FIGS. 13A and 13B are flowcharts illustrating a flow of a process for generating a retrieval result image according to the first embodiment.
Figure 13B:
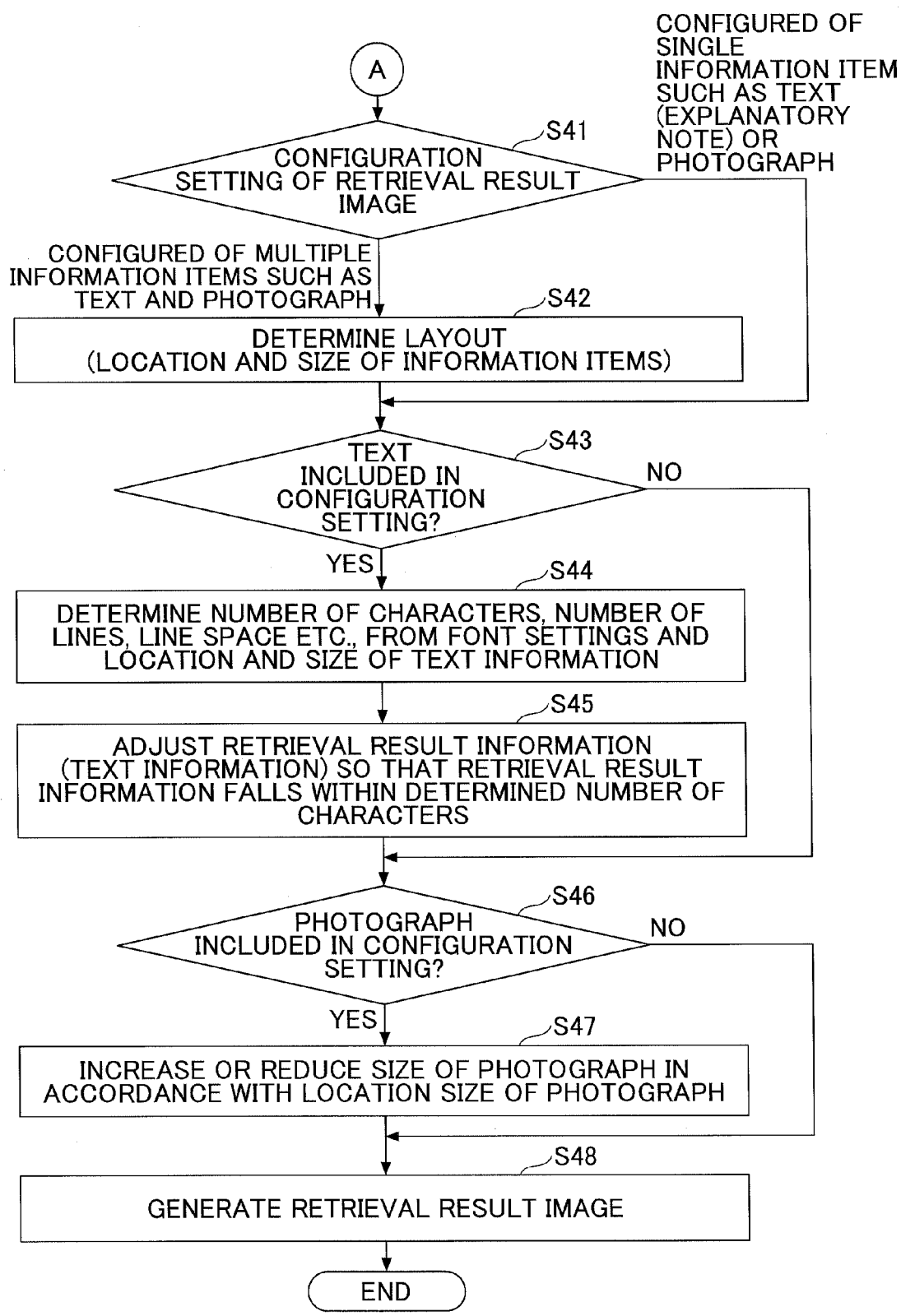

The image generating function part 63 generates, according to the process illustrated in FIGS. 13A and 13B, a retrieval result image by processing the retrieval result to an appropriate amount of information so that the retrieval result fits in the size of the result display area sent from the projector 11.

FIGS. 13A and 13B are flowcharts illustrating a flow of a process for generating a retrieval result image. The process illustrated in FIGS. 13A and 13B corresponds to the process of step S25 of FIG. 11.

Referring to FIG. 13A, in step S31, the image generating function part 63 refers to the setting values of font settings. Here, the font settings include, for example, a font color, a font size, and a typeface such as Arial or Gothic to be reflected in the text (characters) of a retrieval result image. The setting values of the font settings may be set to either "Automatic" or "Manual."

If "Automatic" is set in the setting values of the font settings, in step S32, the image generating function part 63 automatically determines the font settings based on the font settings and the background color of the image of presentation material (presentation data), which is a slide or page in which a retrieval result image is to be displayed, the size of a result display area, and related information. For example, the image generating function part 63 equalizes the font size and typeface of a retrieval result image with those of the image of presentation material. Further, for example, if the amount of related information is large, the image generating function part 63 reduces font size by one point. The contents of the automatic settings may be determined in detail by a presenter or the like.

If "Manual" is set in the setting values of the font settings, in step S33, the image generating function part 63 reads font settings pre-recorded (pre-registered) by a presenter or the like from a non-volatile storage such as the secondary storage device 54 (FIG. 4). Multiple sets of font settings may be recorded in advance.

In step S34, the image generating function part 63 refers to the setting value of a configuration setting for a retrieval result image. Here, the configuration setting for a retrieval result image refers to a setting as to, for example, whether to compose a retrieval result image of text, a photograph, or text and a photograph, etc. The setting value of a configuration setting for a retrieval result image may be set to either "Automatic" or "Manual." The configuration of a retrieval result image is not limited to text and/or a photograph, and may include video, an audio playback button, a link to a Web page, etc. By way of example, this embodiment illustrates a retrieval result image composed of text and/or a photograph.

If "Automatic" is set in the setting value of a configuration setting for a retrieval result image, in step S35, the image generating function part 63 determines whether the retrieval result contains a photograph. If the retrieval result contains no photograph (NO in step S35), in step S36, the image generating function part 63 determines that the configuration setting for a retrieval result image is text.

If the retrieval result contains a photograph (YES in step S35), in step S37, the image generating function part 63 determines whether the retrieval result contains text. If the retrieval result contains no text (NO in step S37), in step S38, the image generating function part 63 determines that the configuration setting for a retrieval result image is a photograph. If the retrieval result contains text (YES in step S37), in step S39, the image generating function part 63 determines that the configuration setting for a retrieval result image is text and a photograph.

If "Manual" is set in the setting value of a configuration setting for a retrieval result image, in step S40, the image generating function part 63 reads a configuration setting for a retrieval result image pre-recorded (pre-registered) by a presenter or the like from a non-volatile storage such as the secondary storage device 54 (FIG. 4). Multiple configuration settings for a retrieval result image may be recorded in advance.

After step S36, step S38, step S39 or step S40, in step S41 of FIG. 13B, the image generating function part 63 confirms the determined or read configuration setting for a retrieval result image. If the determined or read configuration setting for a retrieval result image is a single information item such as text or a photograph, the image generating function part 63 locates the single information item such as text or a photograph in the entire result display area.

If the determined or read configuration setting for a retrieval result image includes multiple information items such as text and a photograph, in step S42, the image generating function part 63 determines the layout (location and size) of the multiple information items such as text and a photograph, and locates the multiple information items according to the determined layout.

Examples of the method of determining the layout of multiple information items such as text and a photograph in the result display area include, in the case of, for example, size, equally dividing the result display area by the number of information items (for example, two in the case of text and a photograph) and dividing the result display area with the ratio of the size of the location of a photograph to the size of the location of text being 2:1. Further, in the case of location, the method of determining the layout of multiple information items such as text and a photograph in the result display area may place text on the left side and a photograph on the right side or place text on the upper side and a photograph on the lower side. The presenter or the like may be allowed to determine details of the method of determining the layout of multiple information items such as text and a photograph in the result display area.

In step S43, the image generating function part 63 determines whether the determined or read configuration setting for a retrieval result image includes text. If the determined or read configuration setting for a retrieval result image includes text (YES in step S43), in step S44, the image generating function part 63 determines the number of characters (the total number of characters and the number of characters per line), the number of lines, a line space, etc., based on the font settings determined in step S32 or read in step S33 and the layout of multiple information items such as text and a photograph in the result display area determined in step S42.

In step S45, the image generating function part 63 adjusts the characters of a retrieval result (retrieved characters) so that the number of characters is less than or equal to the determined number of characters. Here, the adjustment refers to processing including, for example, segmenting the characters at the end of a certain clause or phrase to cause the number of characters to be less than or equal to the total number of characters determined in step S44 or truncating the text (characters) to a certain number of characters irrespective of whether the text is segmented in the middle of a clause or phrase, if the number of characters of the retrieval result is more than the total number of characters determined in step S44. The presenter or the like may be allowed to determine the details (contents) of the adjustment. If the determined or read configuration setting for a retrieval result image does not include text (YES in step S43), the image generating function part 63 does not execute the process of step S44 and step S45.

In step S46, the image generating function part 63 determines whether the determined or read configuration setting for a retrieval result image contains a photograph. If the determined or read configuration setting for a retrieval result image includes a photograph (YES in step S46), in step S47, the image generating function part 63 increases or reduces the size of a photograph depending on the determined layout of the photograph in the result display area. If the determined or read configuration setting for a retrieval result image does not include a photograph (NO in step S46), the image generating function part 63 does not execute the process of step S47.

In step S48, the image generating function part 63 generates a retrieval result image based on the result of step S31 through step S47. According to this embodiment, the retrieval result image is not limited to a still image, and may be scrollable or displayable (movable) on a page basis.

Thus, according to the projection system 1 of this embodiment, a word with respect to which retrieval is to be performed may be specified as a keyword in the image of presentation material by the gesture of a presenter, and the result of the retrieval performed using the specified word as a keyword may be combined with a result display area specified in the image of presentation material by the presenter and be displayed.

[b] Second Embodiment

According to the above-described first embodiment, a word with respect to which retrieval is to be performed is specified as a keyword in the image of presentation material with a gesture made by a presenter. Meanwhile, according to a second embodiment, a word with respect to which retrieval is to be performed is specified as a keyword by the voice of a presenter. The second embodiment is the same as the first embodiment except for some part. Accordingly, in the second embodiment, a description of the same part as that of the first embodiment is suitably omitted.

Figure 14:
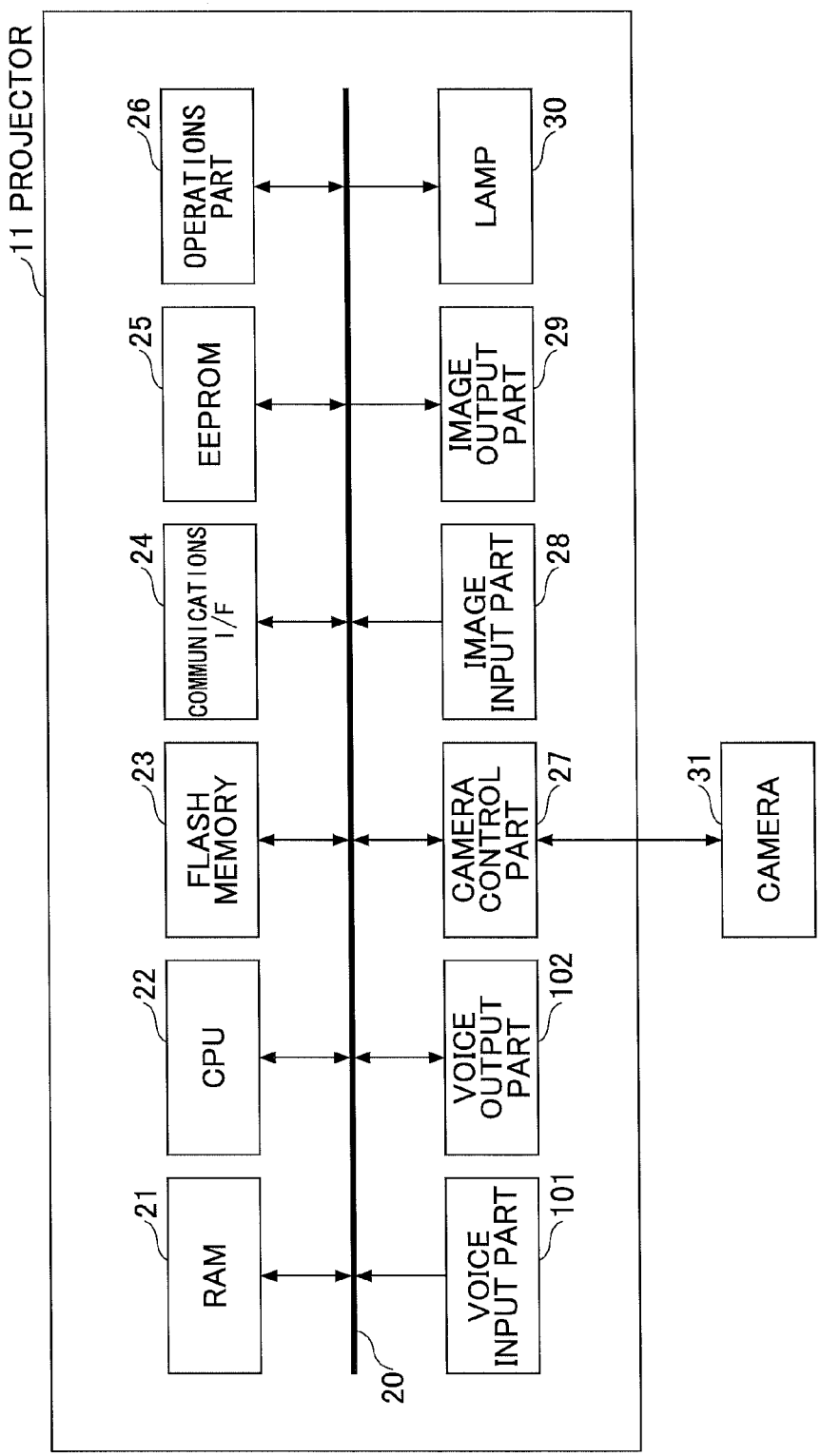
FIG. 14 is a block diagram illustrating a hardware configuration of the projector according to a second embodiment.

According to the second embodiment, the projection system 1 has the same configuration as illustrated in FIG. 1, and accordingly, a description of the configuration of the projection system 1 is omitted. FIG. 14 is a block diagram illustrating a hardware configuration of the projector 11 according to the second embodiment. The projector 11 of FIG. 14 includes a voice input part 101 and a voice output part 102 in addition to the hardware configuration of FIG. 2.

The voice input part 101 collects the speech (voice) of a presenter as voice (audio) data. Examples of the voice input part 101 include a microphone. The voice input part 101 may be housed in the projector 11 or attached externally to the projector 11. The voice output part 102 outputs voice (audio) data. Examples of the voice output part 102 include a loudspeaker. The voice output part 102 may be housed in the projector 11 or attached externally to the projector 11.

Figure 15:
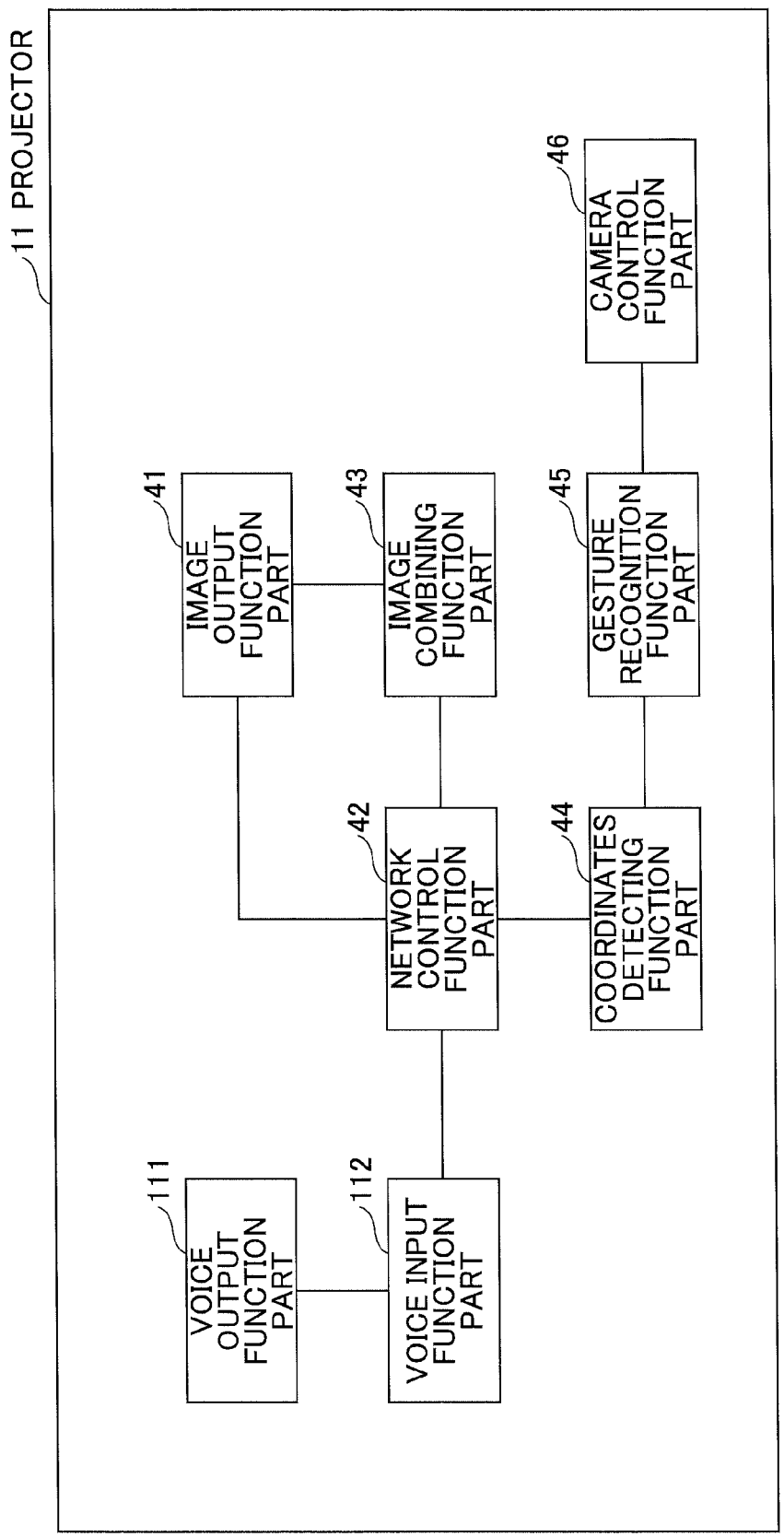
FIG. 15 is a block diagram illustrating a functional configuration of the projector according to the second embodiment.

FIG. 15 is a block diagram illustrating a functional configuration of the projector 11 according to this embodiment. The projector 11 of FIG. 15 includes a voice output function part 111 and a voice input function part 112 in addition to the functional configuration of FIG. 3. The voice output function part 111 controls the voice output part 102 to cause the voice output part 102 to output voice data. The voice input function part 112 controls the voice input part 101 to cause the voice input part 101 to collect what a presenter says (the speech of a presenter) as voice data.

Figure 16:
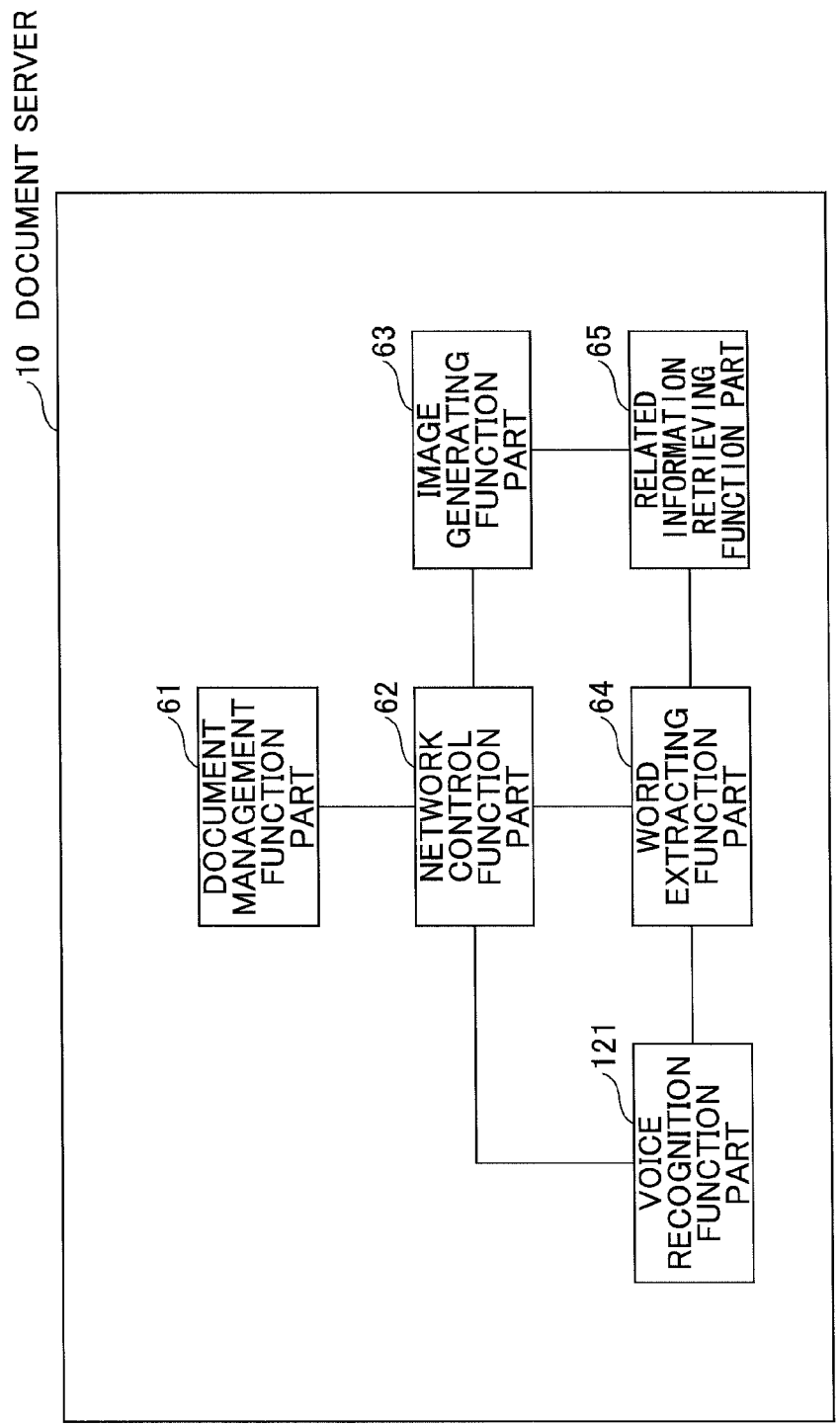
FIG. 16 is a block diagram illustrating a functional configuration of the document server according to the second embodiment.

According to this embodiment, the document server 10 has the same hardware configuration as illustrated in FIG. 4. Accordingly, a description of the hardware configuration of the document server 10 according to the second embodiment is omitted. FIG. 16 is a block diagram illustrating a functional configuration of the document server 10 according to this embodiment. The document server 10 of FIG. 16 includes a voice recognition function part 121 in addition to the functional configuration of FIG. 5. The voice recognition function part 121 converts voice data into text data.

The network control function part 62 receives voice data and result display area information from the projector 11. The voice data are a recording of the speech of a presenter collected by the projector 11. The voice recognition function part 121 converts the voice data received from the projector 11 by the network control function part 62 into text data.

The related information retrieving function part 65 retrieves related information from the World Wide Web, a specified database or the like using the text data into which the voice data have been converted by the voice recognition function part 121 as a keyword. The image generating function part 63 generates a retrieval result image so that the retrieved related information (retrieval result) fits in the size of the result display area sent from the projector 11. The retrieval result image is transmitted to the projector 11.

Figure 17:
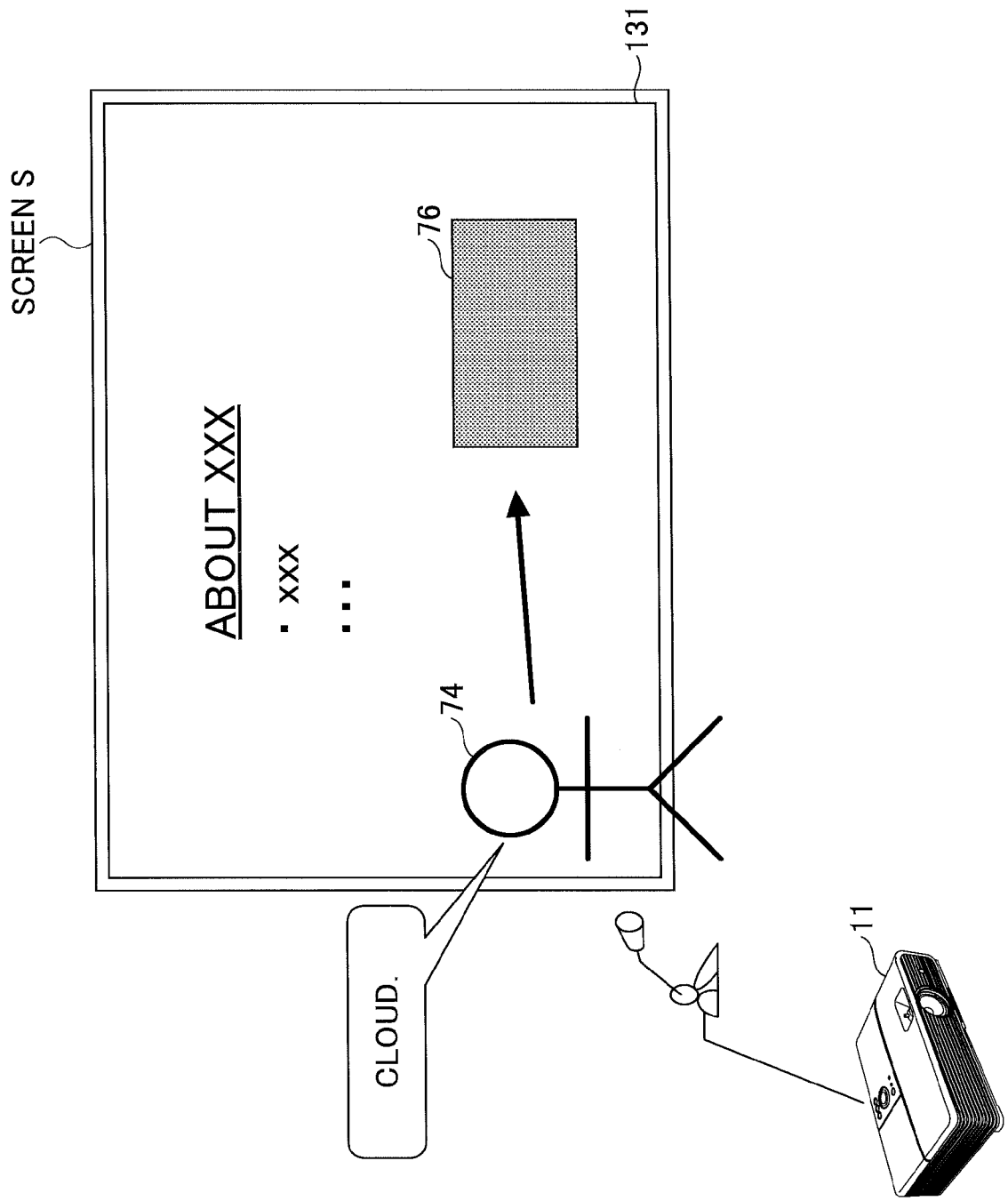
FIG. 17 is a conceptual diagram illustrating an image projected on the screen according to the second embodiment.

FIG. 17 is a conceptual diagram illustrating an image projected on the screen. First, the projector 11 projects an image 131 of presentation material obtained from the document server 10 onto the screen S as illustrated in FIG. 17. Then, after making a gesture to indicate "the start of inputting a keyword by voice", the presenter 74 says, "Cloud," as a keyword with respect to which retrieval is desired to be performed as illustrated in FIG. 17. After saying a keyword with respect to which retrieval is desired to be performed, the presenter 74 makes a gesture to indicate "the end of inputting a keyword by voice." The presenter 74 specifies, with a gesture, the position and size of the result display area 76 in which a retrieval result image is desired to be displayed.

The voice input part 101 starts to collect the voice data of the speech of the presenter in response to the presenter making a gesture to indicate "the start of inputting a keyword by voice," and continues to collect the voice data until the presenter makes a gesture to indicate "the end of inputting a keyword by voice." The collected voice data of the speech of the presenter are transmitted from the projector 11 to the document server 10.

The voice recognition function part 121 converts the voice data received from the projector 11 into text data. The related information retrieving function part 65 extracts, as a keyword, the text data into which the voice data have been converted by the voice recognition function part 121. The process after the extraction of the keyword is the same as in the first embodiment, and accordingly, a description of the process is omitted.

Figure 18:
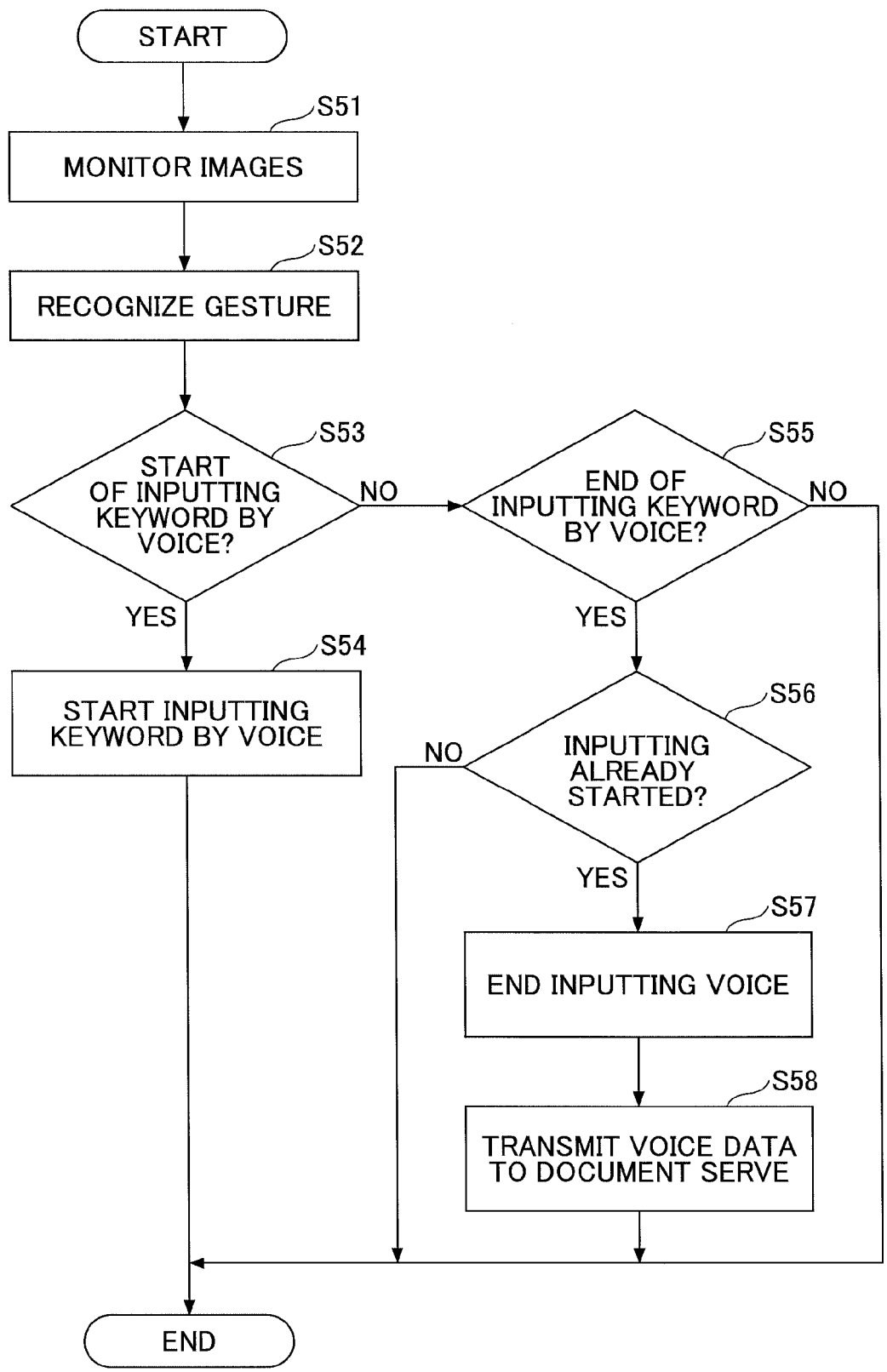
FIG. 18 is a flowchart illustrating a flow of a process performed by the projector according to the second embodiment.

FIG. 18 is a flowchart illustrating a flow of a process performed by the projector 11 according to this embodiment. In the flowchart of FIG. 18, the process in the case of recognizing the gesture as specifying a result display area (steps S5 through S9) and the process in the case of recognizing the gesture as intending the movement of the display position of a retrieval result image (steps S10 and S11) illustrated in the flowchart of FIG. 10 are omitted.

In step S51, the gesture recognition function part 45 monitors images (or video) captured with the camera 31. In step S52, the gesture recognition function part 45 recognizes (identifies) a particular gesture of a presenter in the images captured with the camera 31.

In step S53, the gesture recognition function part 45 determines whether the recognized gesture is a gesture that indicates the start of inputting a keyword by voice. If the gesture recognition function part 45 recognizes the gesture as indicating the start of inputting a keyword by voice (YES in step S53), in step S54, the voice input function part 112 controls the voice input part 101 to start inputting the voice of the speech of the presenter.

If the gesture recognition function part 45 does not recognize the gesture as indicating the start of inputting a keyword by voice in step S53 (NO in step S53), in step S55, the gesture recognition function part 45 determines whether the recognized gesture is a gesture that indicates the end of inputting a keyword by voice.

If the gesture recognition function part 45 recognizes the gesture as indicating the end of inputting a keyword by voice in step S55 (YES in step S55), in step S56, the voice input function part 112 determines whether voice inputting has been started. If voice inputting has been started (YES in step S56), in step S57, the voice input function part 112 controls the voice input part 101 to end the inputting of the voice of the speech of the presenter.

In step S58, the network control function part 42 transfers the voice data of the speech of the presenter, collected for the period between the recognition (detection) of the presenter's gesture indicating the start of inputting a keyword by voice and the recognition (detection) of the presenter's gesture indicating the end of inputting a keyword by voice, to the document server 10.

If the voice input function part 112 determines in step S56 that voice inputting has not been started (NO in step S56), the voice input function part 112 does not execute the process of step S57. If the voice input function part 112 determines in step S56 that voice inputting has not been started (NO in step S56), the network control function part 42 does not execute the process of step S58. If the gesture recognition function part 45 does not recognize the gesture as indicating the end of inputting a keyword by voice in step S55 (NO in step S55), the process of steps S56 through S58 is not executed.

As illustrated in the flowchart of FIG. 18 as well as the flowchart of FIG. 10, the projector 11 may recognize (identify) gestures of a presenter in images or video captured with the camera 31, and receive instructions from the presenter correlated with the gestures, such as the start of inputting a keyword by voice, the end of inputting a keyword by voice, the specifying of a result display area, and the movement of the display position of a retrieval result image.

Figure 19:
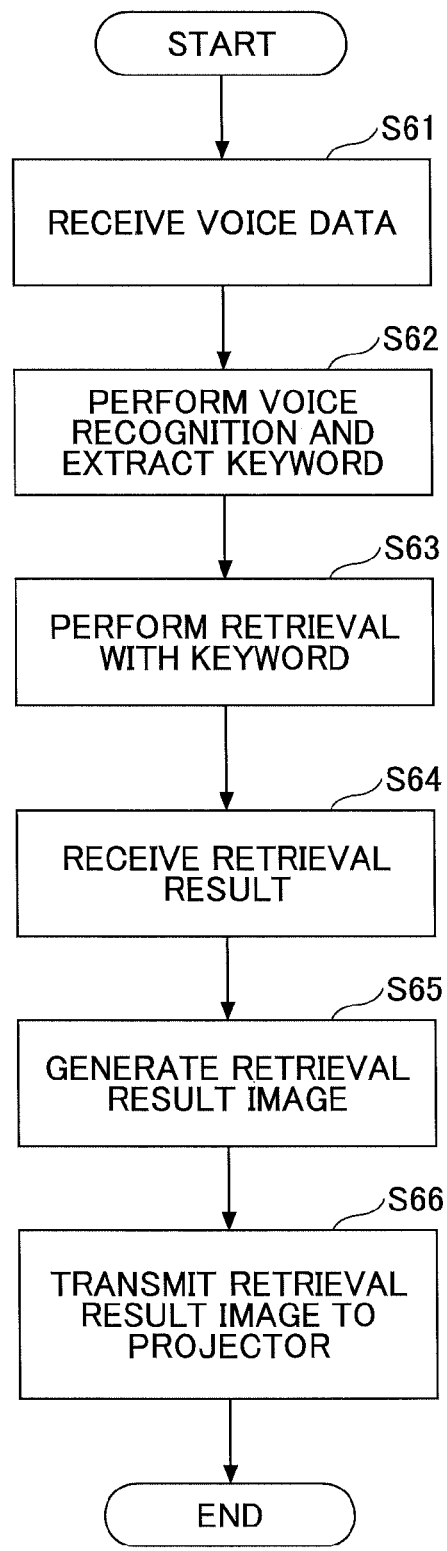
FIG. 19 is a flowchart illustrating a flow of a process performed by the document server according to the second embodiment.

FIG. 19 is a flowchart illustrating a flow of a process performed by the document server 10 according to this embodiment.

In step S61, the network control function part 62 receives the voice data of the speech of a presenter collected by the projector 11. In step S62, the voice recognition function part 121 converts the voice data received from the projector 11 into text data by voice recognition, and extracts the text data as a keyword. The process of steps S63 through S66 after the extraction of the keyword is the same as the process of steps S23 through S26 of FIG. 1, and accordingly, a description of the process of steps S63 through S66 is omitted.

As illustrated in the flowchart of FIG. 19, the document server 10 may extract a keyword said by a presenter by performing voice recognition on the voice data of the speech of the presenter received from the projector 11. As a result, the document server 10 may generate a retrieval result image from related information retrieved using the keyword said by the presenter, and transmit the generated retrieval result image to the projector 11.

Thus, according to the projection system 1 of this embodiment, a word with respect to which retrieval is to be performed may be specified as a keyword by the voice of a presenter, and the result of the retrieval performed using the specified word as a keyword may be combined with a result display area specified in the image of presentation material by the presenter and be displayed.

[c] Third Embodiment

According to the second embodiment, the voice data of a recording of the speech of a presenter are subjected to voice recognition in the document server 10. Meanwhile, according to a third embodiment, the voice data of a recording of the speech of a presenter are subjected to voice recognition in the projector 11. According to the third embodiment, the data transmitted from the projector 11 to the document server 10 are changed from voice data, which are relatively large in size, to text data, which are relatively small in size, so that improvement in response may be expected. Further, the start of inputting a keyword by voice and the end of inputting a keyword by voice may be indicated by voice. Therefore, there is no need to learn or remember gestures for the start of inputting a keyword by voice and the end of inputting a keyword by voice. The third embodiment is the same as the first embodiment and the second embodiment except for some part. Accordingly, in the third embodiment, a description of the same part as that of the first or second embodiment is suitably omitted.

Figure 20:
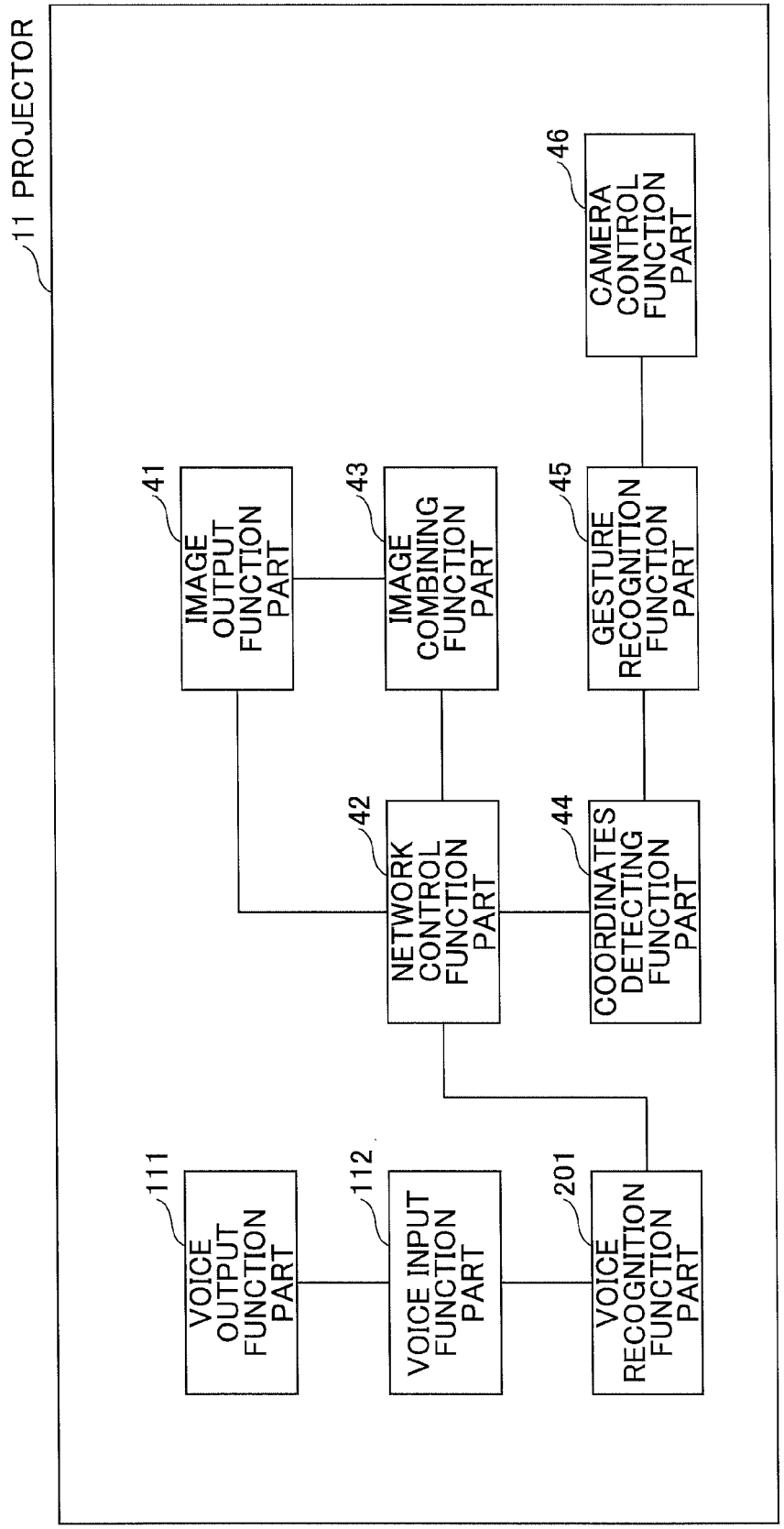
FIG. 20 is a block diagram illustrating a functional configuration of the projector according to a third embodiment.

According to the third embodiment, the projection system 1 has the same configuration as illustrated in FIG. 1, and accordingly, a description of the configuration of the projection system 1 is omitted. Further, the projector 11 has the same hardware configuration as illustrated in FIG. 14. Accordingly, a description of the hardware configuration of the projector 11 is omitted. FIG. 20 is a block diagram illustrating a functional configuration of the projector 11 according to the third embodiment. The projector 11 of FIG. 20 includes a voice recognition function part 201 in addition to the functional configuration of FIG. 15. The voice recognition function part 201 converts the voice data of the speech of a presenter collected by the voice input function part 112 controlling the voice input part 101 into text data.

Figure 21:
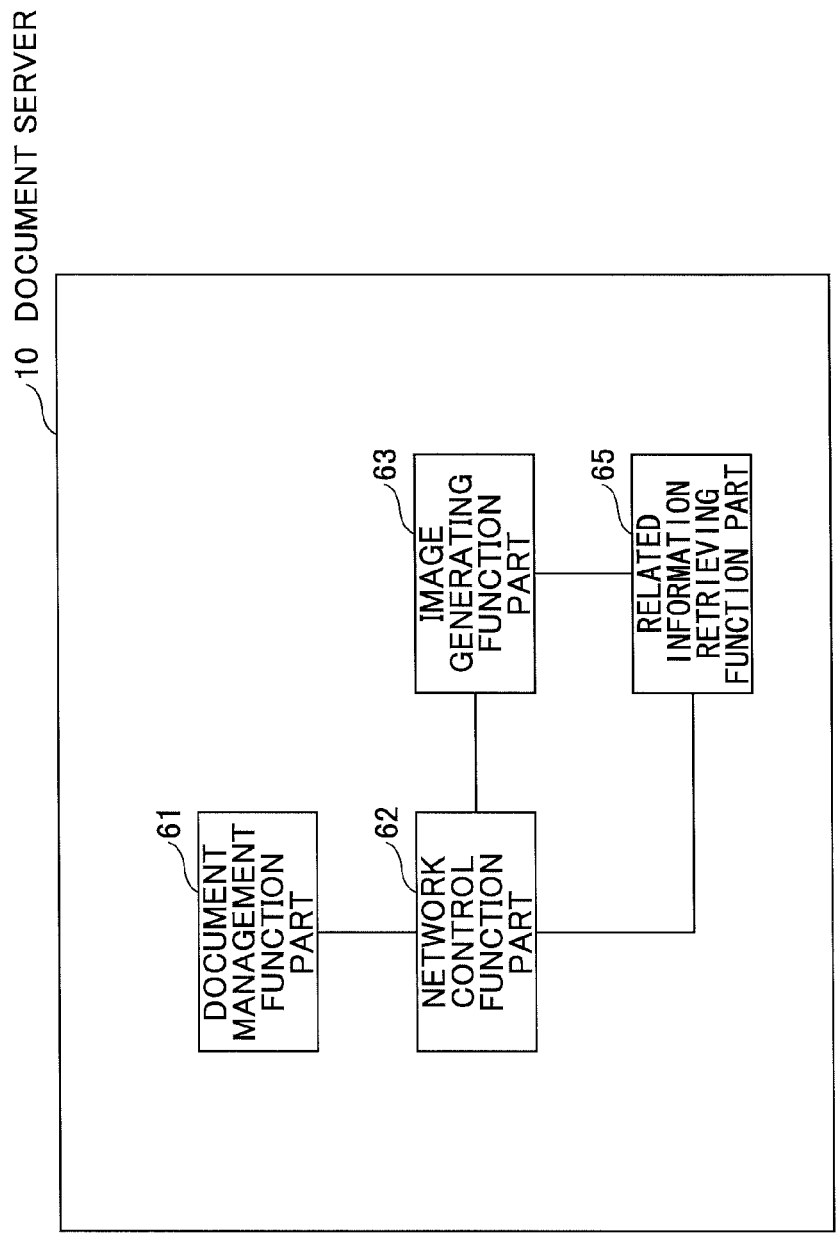
FIG. 21 is a block diagram illustrating a functional configuration of the document server according to the third embodiment.

The document server 10 has the same hardware configuration as illustrated in FIG. 4. Accordingly, a description of the hardware configuration of the document server 10 is omitted. FIG. 21 is a block diagram illustrating a functional configuration of the document server 10 according to the third embodiment. The document server 10 of FIG. 21 has a functional configuration formed by deleting the word extracting function part 64 and the voice recognition function part 121 from the functional configuration of the document server 10 of FIG. 16.

The network control function part 62 receives a keyword and result display area information from the projector 11. The keyword is text data into which the voice data of the speech of a presenter has been converted by voice recognition. The related information retrieving function part 65 retrieves related information from the World Wide Web, a specified database or the like with the keyword received from the projector 11. The image generating function part 63 generates a retrieval result image (the image of a retrieval result) so that the retrieved related information (retrieval result) fits in the size of the result display area sent from the projector 11. The retrieval result image is transmitted to the projector 11.

Figure 22:
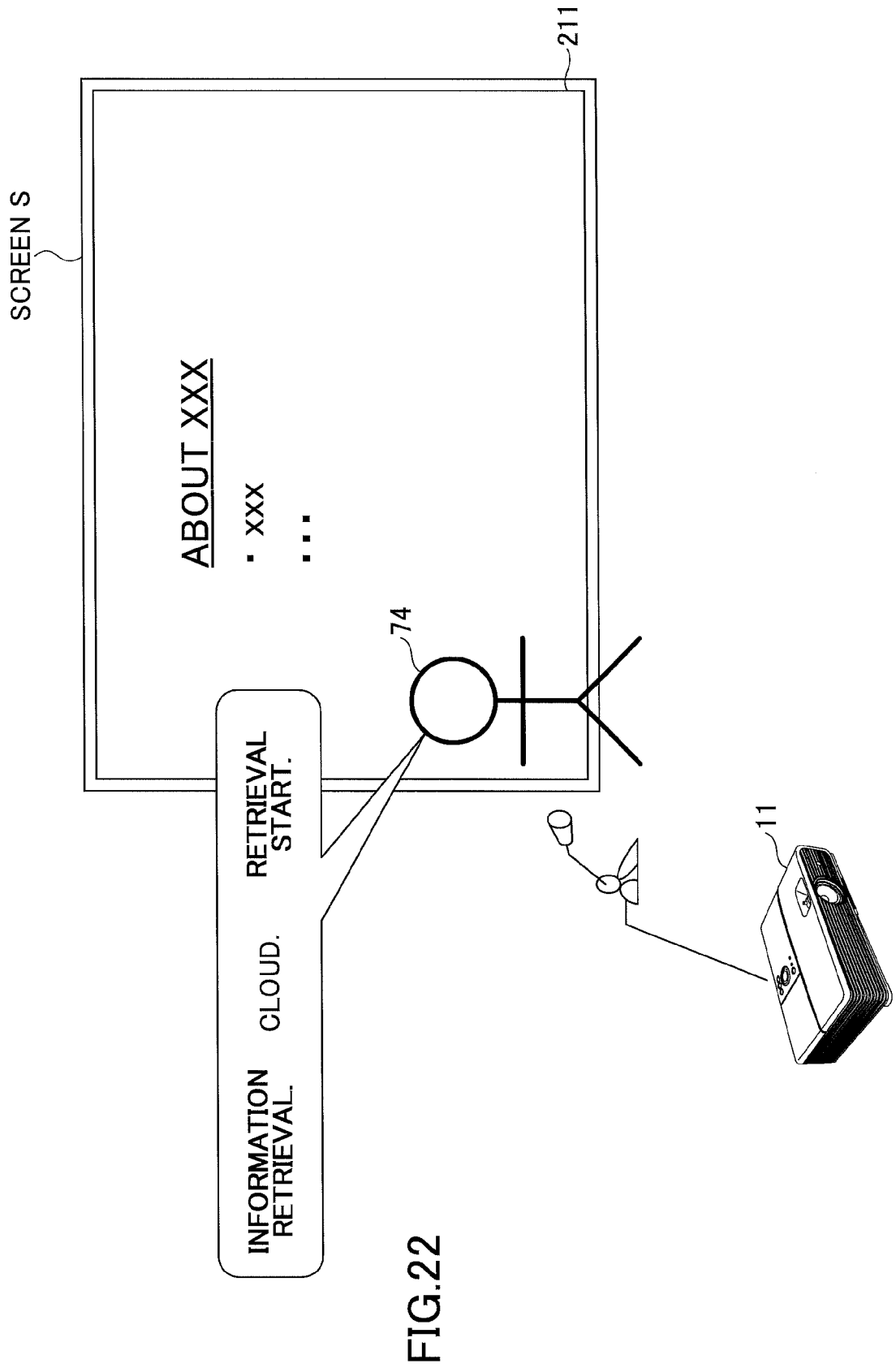
FIG. 22 is a conceptual diagram illustrating an image projected on the screen according to the third embodiment.

FIG. 22 is a conceptual diagram illustrating an image projected on the screen. First, the projector 11 projects an image 211 of presentation material obtained from the document server 10 onto the screen S as illustrated in FIG. 22.

The presenter 74 says, for example, "Information retrieval," as a phrase indicating "the start of inputting a keyword by voice," and thereafter, the presenter 74 says, for example, "Cloud," as a keyword with respect to which retrieval is desired to be performed. Then, the presenter 74 says, for example, "Retrieval start," as a phrase indicating "the end of inputting a keyword by voice." The presenter 74 specifies, with a gesture, the position and size of the result display area 76 (see, for example, FIG. 8) in which a retrieval result image is desired to be displayed.

The start of inputting a keyword by voice and the end of inputting a keyword by voice may also be indicated by a word, a sentence or the like in a suitable manner.

The speech of the presenter is constantly input to the projector 11. The voice recognition function part 201 converts the voice data of the speech of the presenter into text data. The network control function part 42 detects a phrase indicating "the start of inputting a keyword by voice" and a phrase indicating "the end of inputting a keyword by voice" in the text data.

The network control function part 42 starts to transmit the text data to the document server 10 as a keyword in response to the detection of a phrase indicating "the start of inputting a keyword by voice," and continues to transmit the text data until the detection of a phrase indicating "the end of inputting a keyword by voice." The related information retrieving function part 65 of the documenter server 10 extracts the keyword received from the projector 11. The process after the extraction of the keyword is the same as in the first or second embodiment, and accordingly, a description of the process is omitted.

Figure 23:
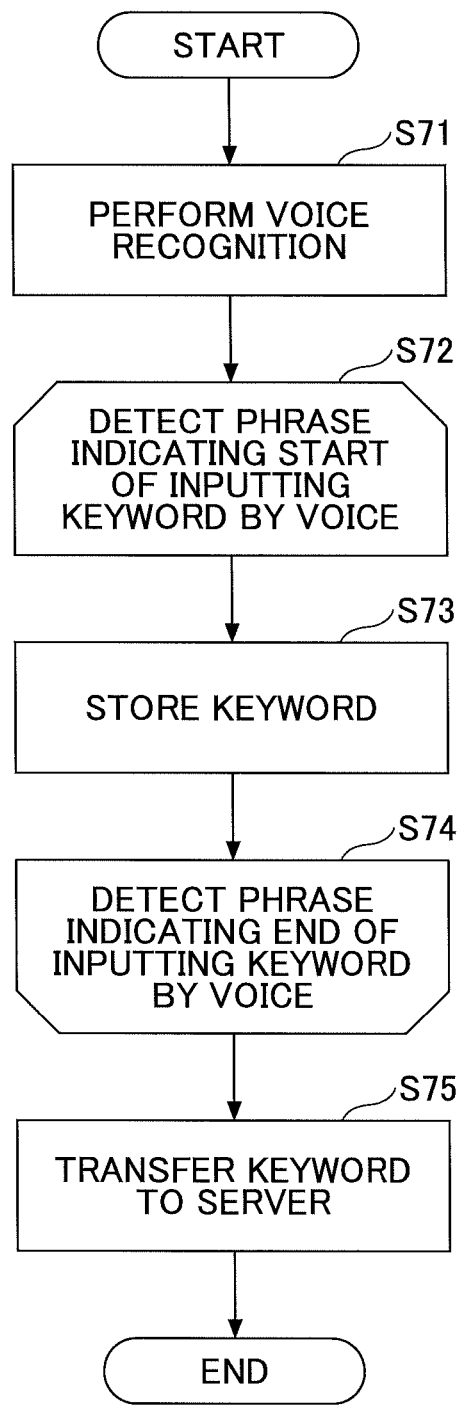
FIG. 23 is a flowchart illustrating a flow of a process performed by the projector according to the third embodiment.

FIG. 23 is a flowchart illustrating a flow of a process performed by the projector 11 according to this embodiment. In the flowchart of FIG. 23, the process in the case of recognizing the gesture as specifying a result display area (steps S5 through S9) and the process in the case of recognizing the gesture as intending the movement of the display position of a retrieval result image (steps S10 and S11) illustrated in the flowchart of FIG. 10 are omitted.

In step S71, the voice recognition function part 201 converts the voice data of the speech of a presenter into text data by voice recognition. In response to the detection of a phrase indicating "the start of inputting a keyword by voice" in step S72, in step S73, the network control function part 42 stores the text data as a keyword until the detection of a phrase indicating "the end of inputting a keyword by voice" in step S74.

In response to the detection of a phrase indicating "the end of inputting a keyword by voice" in step S74, in step S75, the network control function part 42 transfers the keyword stored in step S73 to the document server 10.

As illustrated in the flowchart of FIG. 23, the projector 11 may receive instructions such as the start of inputting a keyword by voice and the end of inputting a keyword by voice from the voice data of a recording of the speech of a presenter.

Figure 24:
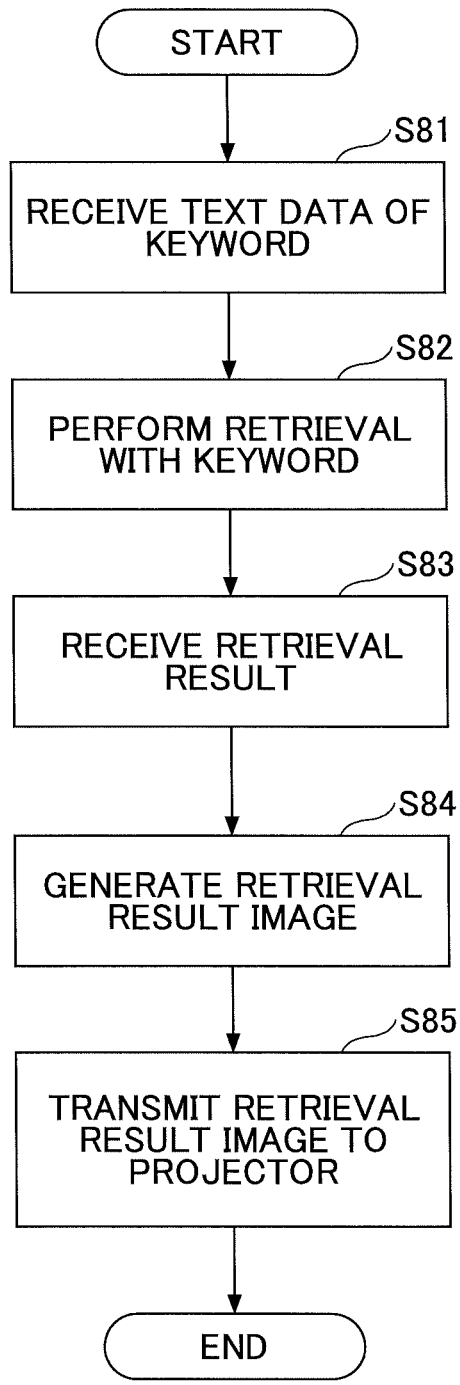
FIG. 24 is a flowchart illustrating a flow of a process performed by the document server according to the third embodiment.

FIG. 24 is a flowchart illustrating a flow of a process performed by the document server 10 according to this embodiment.

In step S81, the network control function part 62 receives the text data of a keyword from the projector 11. The process of steps S82 through S85 after the reception of the keyword is the same as the process of steps S63 through S66 of FIG. 19. Accordingly, a description of the process of steps S82 through S85 is omitted.

As illustrated in the flowchart of FIG. 24, the document server 10 may receive a keyword from the projector 11. As a result, the document server 10 may generate a retrieval result image from related information retrieved using the keyword said by the presenter, and transmit the generated retrieval result image to the projector 11.

Thus, according to the projection system 1 of this embodiment, a word with respect to which retrieval is to be performed may be specified as a keyword by the voice of a presenter, and the result of the retrieval performed using the specified word as a keyword may be combined with a result display area specified in the image of presentation material by the presenter and be displayed.

[d] Fourth Embodiment

According to the first embodiment, a word with respect to which retrieval is to be performed is specified as a keyword in the image of presentation material with a gesture made by a presenter. According to the second and third embodiments, a word with respect to which retrieval is to be performed is specified as a keyword by the voice of a presenter.

Meanwhile, according to a fourth embodiment, a word with respect to which retrieval is to be performed is specified as a keyword or a pattern image by capturing an image of an object used by a presenter in the presentation with the camera 31. The fourth embodiment is the same as the first embodiment through the third embodiment except for some part. Accordingly, in the fourth embodiment, a description of the same part as that of the first, second, or the third embodiment is suitably omitted.

According to the fourth embodiment, the projection system 1 has the same configuration as illustrated in FIG. 1, and accordingly, a description of the configuration of the projection system 1 is omitted. Further, the projector 11 has the same hardware configuration as illustrated in FIG. 2. Accordingly, a description of the hardware configuration of the projector 11 is omitted. Further, the projector 11 has the same functional configuration as illustrated in FIG. 3. Accordingly, a description of the functional configuration of the projector 11 is omitted.

Figure 25:
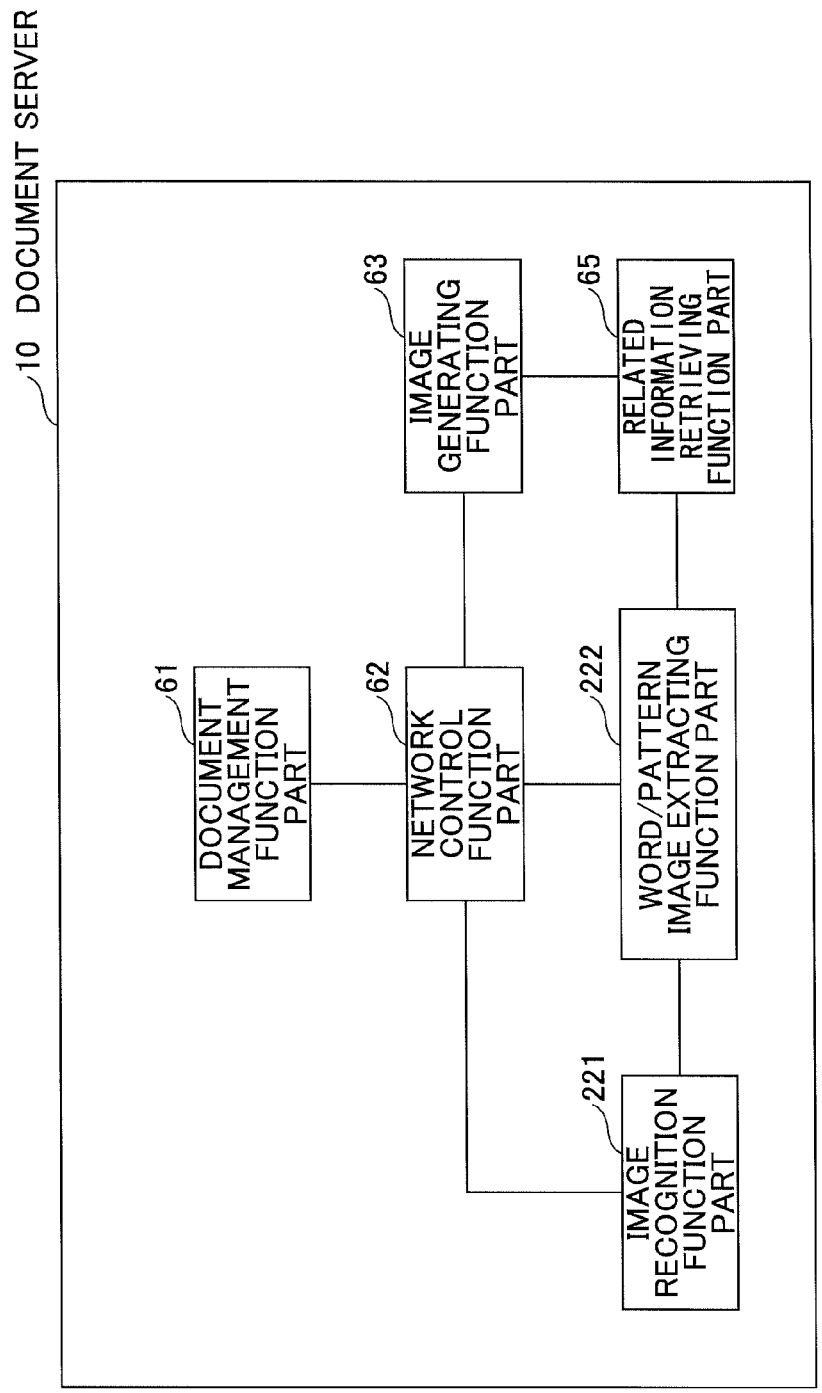
FIG. 25 is a block diagram illustrating a functional configuration of the document server according to a fourth embodiment.

The document server 10 has the same hardware configuration as illustrated in FIG. 4. Accordingly, a description of the hardware configuration of the document server 10 is omitted. FIG. 25 is a block diagram illustrating a functional configuration of the document server 10 according to the fourth embodiment. Compared with the functional configuration of FIG. 5, the document server 10 of FIG. 25 additionally includes an image recognition function part 221 and replaces the word extracting function part 64 of FIG. 5 with a word/pattern image extracting part 222. The image recognition function part 221 converts photographic data (image data) into text data or pattern data.

The network control function part 62 receives photographic data and result display area information from the projector 11. The photographic data are obtained by capturing an image of an object used by a presenter in the presentation with the camera 31 of the projector 11. The image recognition function part 221 converts the photographic data received from the projector 11 by the network control function 62 into text data or pattern data. The word/pattern image extracting function part 222 extracts, as a keyword or a pattern image, the text data or pattern data into which the photographic data have been converted by the image recognition function part 221.

The related information extracting function part 65 retrieves related information from the World Wide Web, a specified database or the like using the text data or pattern data into which the photographic data have been converted by the image recognition function part 221 as a keyword or a pattern image. The image generating function part 63 generates a retrieval result image (the image of a retrieval result) so that the retrieved related information (retrieval result) fits in the size of the result display area sent from the projector 11. The retrieval result image is transmitted to the projector 11.

Figure 26:
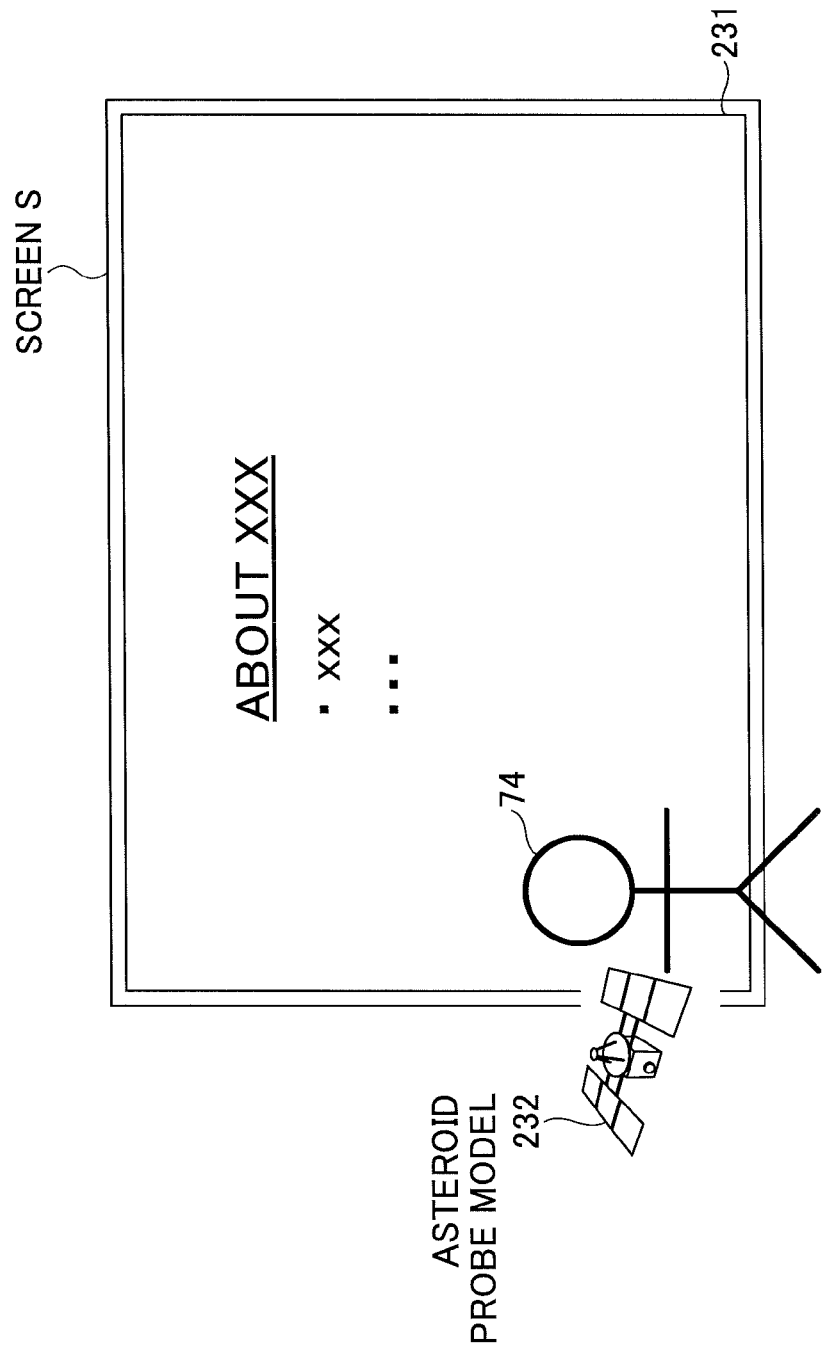
FIG. 26 is a conceptual diagram illustrating an image projected on the screen according to the fourth embodiment.

FIG. 26 is a conceptual diagram illustrating an image projected on the screen. First, the projector 11 projects an image 231 of presentation material obtained from the document server 10 onto the screen S as illustrated in FIG. 26. Then, the presenter 74 makes a gesture to indicate "the start of inputting a keyword or a pattern image with a photograph," and thereafter, causes the camera 31 to capture an image of an asteroid probe model 232 used by the presenter 74 in the presentation as a keyword or a pattern image with respect to which retrieval is desired to be performed. The photographic data of the captured image of the asteroid probe mode 232 are transmitted from the projector 11 to the document server 10. The image captured by the projector 11 is not limited to a photograph (still image) and may be video.

The image recognition function part 221 converts the photographic data received from the projector 11 into text data or pattern data. The word/pattern image extracting function part 222 extracts, as a keyword or a pattern image, the text data or pattern data into which the photographic data have been converted by the image recognition function part 221. The process after the extraction of the keyword or pattern data is the same as in the first embodiment. Accordingly, a description of the process is omitted.

Figure 27:
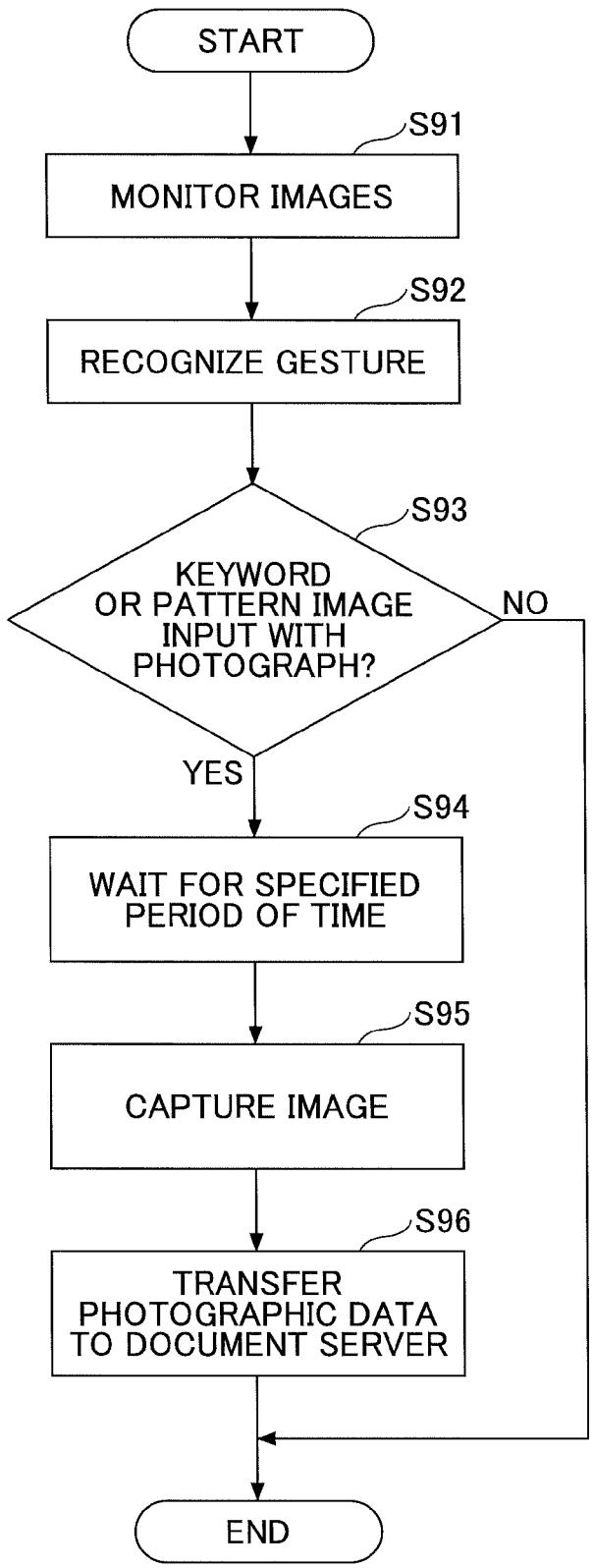
FIG. 27 is a flowchart illustrating a flow of a process performed by the projector according to the fourth embodiment.

FIG. 27 is a flowchart illustrating a flow of a process performed by the projector 11 according to this embodiment. In the flowchart of FIG. 27, the process in the case of recognizing the gesture as specifying a result display area (steps S5 through S9) and the process in the case of recognizing the gesture as intending the movement of the display position of a retrieval result image (steps S10 and S11) illustrated in the flowchart of FIG. 10 are omitted.

In step S91, the gesture recognition function part 45 monitors images (or video) captured with the camera 31. In step S92, the gesture recognition function part 45 recognizes (identifies) a particular gesture of a presenter in the images captured with the camera 31. In step S93, the camera control function part 46 determines whether the gesture indicates the inputting of a keyword or a pattern image with a photograph. If the camera control function part 46 recognizes the gesture as indicating the inputting of a keyword or a pattern image with a photograph in step S93 (YES in step S93), in step S94, the camera control function part 46 waits for a specified period of time. Then, in step S95, the camera control function part 46 controls the camera 31 to capture an image (or video) of the asteroid probe model 232 used by the presenter in the presentation. In step S96, the network control function part 42 transfers the photographic data of the captured image of the asteroid probe model 232 to the document server 10. If the camera control function part 46 does not recognize the gesture as indicating the inputting of a keyword or a pattern image with a photograph in step S93 (NO in step S93), the process of steps S94 through S96 is not executed.

As illustrated in the flowchart of FIG. 27 as well as the flowchart of FIG. 10, the projector 11 may recognize (identify) gestures of a presenter in images or video captured with the camera 31, and receive instructions from the presenter correlated with the gestures, such as the inputting of a keyword or a pattern image with a photograph, the specifying of a result display area, and the movement of the display position of a retrieval result image.

Figure 28:
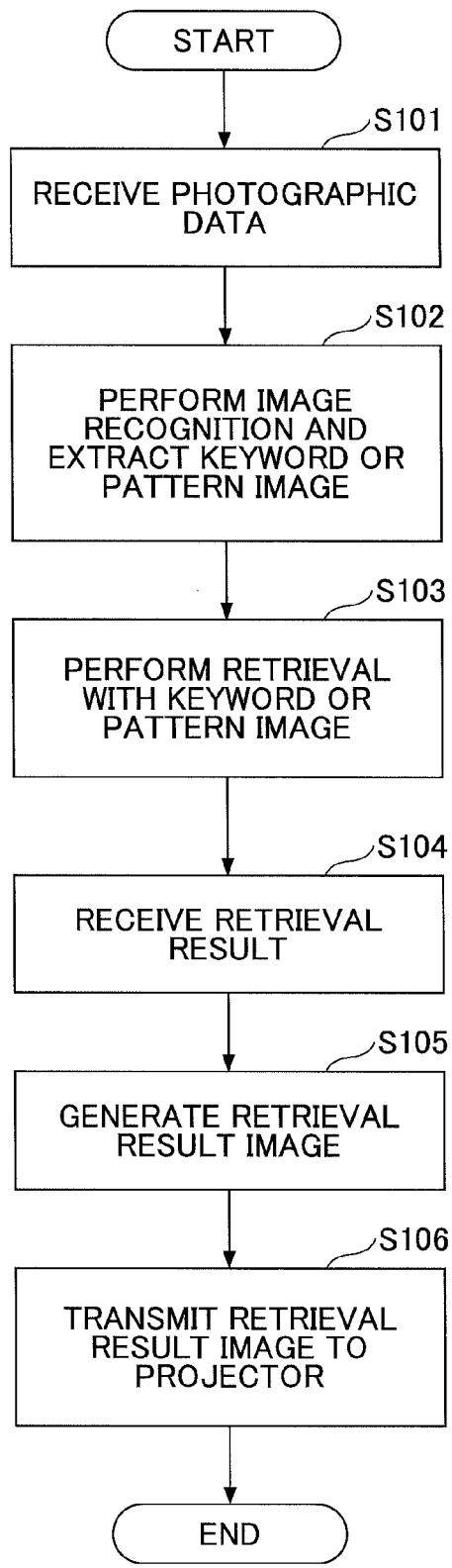
FIG. 28 is a flowchart illustrating a flow of a process performed by the document server according to the fourth embodiment.

FIG. 28 is a flowchart illustrating a flow of a process performed by the document server 10 according to this embodiment.

In step S101, the network control function part 62 receives the photographic data of the image of the asteroid probe model 232 captured by the projector 11. In step S102, the image recognition function part 221 converts the photographic data received from the projector 11 into text data or pattern data by image recognition.

The word/pattern image extracting function part 222 extracts, as a keyword or a pattern image, the text data or pattern data into which the photographic data have been converted by the image recognition function part 221. Existing techniques may be used for the process of converting the photographic data into text data or pattern data by image recognition. The process of steps S103 through S106 after the extraction of the keyword or pattern image is the same as the process of steps S23 through S26 of FIG. 11. Accordingly, a description of the process of steps S103 through S106 is omitted.

As illustrated in the flowchart of FIG. 28, the document server 10 may extract a keyword or a pattern image from the photographic data of a captured image received from the projector 11 by performing image recognition on the received photographic data. As a result, the document server 10 may generate a retrieval result image from related information retrieved using the keyword or pattern image extracted from the photographic data, and transmit the generated retrieval result image to the projector 11.

Thus, according to the projection system 1 of this embodiment, a word with respect to which retrieval is to be performed may be specified as a keyword or a pattern image with the photographic data of an object used by a presenter in the presentation, and the result of the retrieval performed using the word as a keyword or a pattern image may be combined with a result display area specified in the image of presentation material by the presenter and be displayed.

Thus, according to the embodiments of the present invention, it is possible to specify the size of a result display area and to generate a retrieval result image processed to an appropriate amount of information so as to fit in the size of the result display area. This allows the result display area to be displayed, for example, over a drawing that does not have to be displayed because a description has been given with reference to the drawing.

Further, according to the embodiments of the present invention, it is possible to generate a retrieval result image from a brief description of a word if the result display area is small in size, and from a detailed description of a word or a photograph or video related to a word if the result display area is large. Thus, a presenter is allowed to display a retrieval result image on the screen in accordance with a situation during the presentation (for example, the progress of the presentation or the level of understanding of the audience of the presentation). As a result, it is possible for a presenter to give a presentation smoothly and efficiently.

According to an aspect of the present invention, a projector includes a display part configured to display a first image by projection; a retrieval object specifying part configured to cause a user of the projector to specify an object of retrieval; a result display area specifying part configured to cause the user to specify an area for displaying the result of a retrieval in the displayed first image; and an image combining part configured to receive a second image of the result of the retrieval from a server that has performed the retrieval with respect to the object of retrieval specified by the user, and to display the second image by combining the second image with the area for displaying the result of the retrieval in the displayed first image.

Here, for example, the image output function part 41 of FIG. 3 may correspond to the display part, the coordinates detecting function part 44, the gesture recognition function part 45, and the camera control function part 46 may correspond to the retrieval object specifying part and the result display area specifying part, and the image combining function part 43 may correspond to the image combining part in the above-described projector.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A projector, comprising:
a display part configured to display a first image by projection;
a retrieval object specifying part configured to cause a user of the projector to specify an object of retrieval;
a result display area specifying part configured to cause the user to specify an area for displaying a result of the retrieval in the displayed first image; and
an image combining part configured to receive a second image of the result of the retrieval from a server that has performed the retrieval with respect to the object of retrieval specified by the user, and to display the second image by combining the second image with the area for displaying the result of the retrieval in the displayed first image.

2. The projector as claimed in claim 1, wherein the retrieval object specifying part comprises:
a recognition part configured to recognize a gesture of the user in a third image captured by an image capturing part, the gesture specifying the object of retrieval by specifying a position in the first image;
a detection part configured to detect the position in the first image specified by the user; and
a transmission part configured to transmit the object of retrieval at the position in the first image specified by the user to the server.

3. The projector as claimed in claim 1, wherein the retrieval object specifying part comprises:
a recognition part configured to recognize a gesture of the user in a third image captured by an image capturing part, the gesture indicating that the object of retrieval is to be specified by voice; and
a transmission part configured to transmit the object of retrieval specified by the voice of the user to the server in a form of voice data.

4. The projector as claimed in claim 1, wherein the retrieval object specifying part comprises:
a conversion part configured to recognize voice of the user recorded by a voice input part and convert voice data of the voice into text data;
a recognition part configured to recognize the object of retrieval specified by the voice of the user in the text data; and
a transmission part configured to transmit the object of retrieval specified by the voice of the user to the server in a form of text data.

5. The projector as claimed in claim 1, wherein the retrieval object specifying part comprises:
a recognition part configured to recognize a gesture of the user in a third image captured by an image capturing part, the gesture indicating that the object of retrieval is to be specified with a captured image; and
a transmission part configured to transmit the object of retrieval specified with the captured image to the server in a form of image data.

6. A projection system, comprising:
a projector; and
a server connected to the projector,
wherein the projector includes
a display part configured to display a first image by projection;

a retrieval object specifying part configured to cause a user of the projector to specify an object of retrieval;

a result display area specifying part configured to cause the user to specify an area for displaying a result of the retrieval in the displayed first image; and an image combining part configured to receive a second image of the result of the retrieval from the server that has performed the retrieval with respect to the object of retrieval specified by the user, and to display the second image by combining the second image with the area for displaying the result of the retrieval in the displayed first image, and wherein the server includes a notification part configured to be notified, by the projector, of the object of retrieval and the area for displaying the result of the retrieval specified by the user;

a retrieval part configured to perform the retrieval with respect to the object of retrieval specified by the user;

a generation part configured to generate the second image by adjusting the result of the retrieval so that the result of the retrieval fits in a size of the area for displaying the result of the retrieval; and a transmission part configured to transmit the generated second image to the projector.

7. The projection system as claimed in claim 6, wherein the retrieval object specifying part of the projector comprises:

a recognition part configured to recognize a gesture of the user in a third image captured by an image capturing part, the gesture specifying the object of retrieval by specifying a position in the first image;

a detection part configured to detect the position in the first image specified by the user; and a transmission part configured to transmit the object of retrieval at the position in the first image specified by the user to the server.

8. The projection system as claimed in claim 6, wherein the retrieval object specifying part of the projector comprises:

a recognition part configured to recognize a gesture of the user in a third image captured by an image capturing part, the gesture indicating that the object of retrieval is to be specified by voice; and a transmission part configured to transmit the object of retrieval specified by the voice of the user to the server in a form of voice data.

9. The projection system as claimed in claim 6, wherein the retrieval object specifying part of the projector comprises:

a conversion part configured to recognize voice of the user recorded by a voice input part and convert voice data of the voice into text data;

a recognition part configured to recognize the object of retrieval specified by the voice of the user in the text data; and a transmission part configured to transmit the object of retrieval specified by the voice of the user to the server in a form of text data.

10. The projection system as claimed in claim 6, wherein the retrieval object specifying part of the projector comprises:

a recognition part configured to recognize a gesture of the user in a third image captured by an image capturing part, the gesture indicating that the object of retrieval is to be specified with a captured image; and a transmission part configured to transmit the object of retrieval specified with the captured image to the server in a form of image data.

11. A retrieved information displaying method executed by a projector, comprising:

displaying a first image by projection;

causing a user of the projector to specify an object of retrieval;

causing the user to specify an area for displaying a result of the retrieval in the displayed first image; and receiving a second image of the result of the retrieval from a server that has performed the retrieval with respect to the object of retrieval specified by the user, and displaying the second image by combining the second image with the area for displaying the result of the retrieval in the displayed first image.

* * * * *